(12) United States Patent
Asano

(10) Patent No.: US 8,274,677 B2
(45) Date of Patent: Sep. 25, 2012

(54) INFORMATION PROCESSING SYSTEM REDUCING INCONVENIENCE RELATING TO DISTANCE BETWEEN COMPUTER AND PRINTER OR THE LIKE

(75) Inventor: Taiga Asano, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 995 days.

(21) Appl. No.: 11/359,949

(22) Filed: Feb. 21, 2006

(65) Prior Publication Data

US 2006/0195495 A1    Aug. 31, 2006

(30) Foreign Application Priority Data

Feb. 25, 2005   (JP) ................................ 2005-051671

(51) Int. Cl.
  *G06F 3/12* (2006.01)
(52) U.S. Cl. ......... 358/1.15; 358/1.1; 358/1.9; 358/1.13
(58) Field of Classification Search .................... None
  See application file for complete search history.

(56) References Cited

U.S. PATENT DOCUMENTS

| | | | |
|---|---|---|---|
| 5,974,233 A * | 10/1999 | Nishiyama et al. | 358/1.16 |
| 6,301,012 B1 * | 10/2001 | White et al. | 358/1.15 |
| 6,453,127 B2 * | 9/2002 | Wood et al. | 399/8 |
| 6,651,894 B2 | 11/2003 | Nimura et al. | |
| 6,681,392 B1 * | 1/2004 | Henry et al. | 717/176 |
| 6,701,380 B2 * | 3/2004 | Schneider et al. | 709/250 |
| 6,710,790 B1 * | 3/2004 | Fagioli | 715/802 |
| 6,744,528 B2 * | 6/2004 | Picoult et al. | 358/1.15 |
| 6,850,255 B2 * | 2/2005 | Muschetto | 715/788 |
| 6,935,565 B2 | 8/2005 | Nimura et al. | |
| 6,959,866 B2 | 11/2005 | Takahashi et al. | |
| 7,042,590 B2 * | 5/2006 | Young | 358/1.18 |
| 7,081,904 B2 * | 7/2006 | Zoller et al. | 345/661 |
| 7,102,781 B2 * | 9/2006 | Brown et al. | 358/1.15 |
| 7,227,657 B1 * | 6/2007 | Haltmeyer | 358/1.15 |
| RE39,801 E * | 8/2007 | Marbry et al. | 709/220 |

(Continued)

FOREIGN PATENT DOCUMENTS

JP    11-163902    6/1999

(Continued)

OTHER PUBLICATIONS

Dec. 1, 2009 Japanese official action in connection with a counterpart Japanese patent application No. 2005-051671.

*Primary Examiner* — Dung Tran
(74) *Attorney, Agent, or Firm* — Cooper & Dunham LLP

(57) ABSTRACT

An information processing system includes a device having a printing unit and an information processing apparatus connected to the device via a network. The device includes a display screen sharing client unit configure to acquire data of a display screen displayed at the information processing apparatus and to display the data of the display screen on a display unit of the device, thereby achieving display screen sharing. The information processing apparatus includes a display screen sharing server unit configured to supply the data of the display screen displayed at the information processing apparatus to the device, and a print setting unit configured to acquire, through a network, usage information necessary to use the printing unit in response instruction from the device, and to spontaneously make a setting necessary to cause the printing unit to print document data stored in the information processing apparatus in response to the usage information.

30 Claims, 34 Drawing Sheets

U.S. PATENT DOCUMENTS

| | | | | |
|---|---|---|---|---|
| 7,253,915 B2* | 8/2007 | Kemp et al. | | 358/1.15 |
| 7,274,477 B2* | 9/2007 | Reese et al. | | 358/1.15 |
| 7,328,505 B2* | 2/2008 | Kondo | | 29/846 |
| 7,349,951 B2* | 3/2008 | Clough et al. | | 709/217 |
| 7,353,373 B2* | 4/2008 | Olbricht | | 713/1 |
| 7,383,554 B2* | 6/2008 | Ozaki et al. | | 719/327 |
| 7,546,353 B2* | 6/2009 | Hesselink et al. | | 709/216 |
| 7,688,466 B2* | 3/2010 | Manchester | | 358/1.15 |
| 7,689,673 B2* | 3/2010 | Kemp et al. | | 709/220 |
| 7,793,285 B2* | 9/2010 | Hattori et al. | | 717/174 |
| 7,853,946 B2* | 12/2010 | Minagawa | | 717/178 |
| 2002/0065853 A1 | 5/2002 | Takahashi et al. | | |
| 2002/0075506 A1* | 6/2002 | Stevenson et al. | | 358/1.15 |
| 2002/0083431 A1* | 6/2002 | Machida | | 717/174 |
| 2002/0135797 A1* | 9/2002 | Al-Kazily et al. | | 358/1.15 |
| 2002/0171863 A1* | 11/2002 | Sesek | | 358/1.15 |
| 2003/0079030 A1* | 4/2003 | Cocotis et al. | | 709/229 |
| 2003/0084105 A1* | 5/2003 | Wiley et al. | | 709/205 |
| 2003/0160989 A1* | 8/2003 | Chapin et al. | | 358/1.13 |
| 2003/0200289 A1* | 10/2003 | Kemp et al. | | 709/221 |
| 2004/0024847 A1 | 2/2004 | Furuta et al. | | |
| 2004/0059800 A1* | 3/2004 | Hanson et al. | | 709/220 |
| 2005/0057780 A1* | 3/2005 | Fujita et al. | | 358/400 |
| 2006/0232795 A1* | 10/2006 | Tsuboi et al. | | 358/1.2 |

FOREIGN PATENT DOCUMENTS

| | | |
|---|---|---|
| JP | 2001-109676 | 4/2001 |
| JP | 2002-232635 | 8/2002 |
| JP | 2002-281195 | 9/2002 |

* cited by examiner

FIG.6

```
Set WSHNetwork = WScript.CreateObject("WScript.Network")
Const strPort = "LPT1"
Const strPrinter = "¥¥xxx.xxx.xxx.xxx¥PRINTERABCD"
Const strUserName = "PrintGuest"
Const strPassword = "PASSWD"
WSHNetwork.AddPrinterConnection strPort,strPrinter,False,strUserName,strPassword  ~ S1
WSHNetwork.AddWindowsPrinterConnection strPrinter  ~ S2
WSHNetwork.SetDefaultPrinter strPrinter  ~ S3
```

INFORMATION PROCESSING SYSTEM REDUCING INCONVENIENCE RELATING TO DISTANCE BETWEEN COMPUTER AND PRINTER OR THE LIKE

BACKGROUND

1. Technical Field

This disclosure generally relates to information processing systems, devices, information processing apparatuses, information processing methods, and information processing programs and record media, and particularly, relates to an information processing system, a device, an information processing apparatus, and an information processing method as well as an information processing program and record medium for use in the information processing system, which includes the device having a printer function and a scanner function and/or FAX function and the information processing apparatus connected to the device via a network.

2. Description of the Related Art

In recent years, research and development have been conducted with respect to multifunctional image input/output devices, which are referred to as multifunction peripherals or combined devices, in an effort to improve their compatibility with computers such as personal computers and also to provide added values through their use as part of document management systems. For example, there are commercially available products that have a VGA (video graphics array) display device implemented on the operation panel, and that serves as a combination of an image input/output device and a personal computer.

Further, it is now possible to perform remote control from a personal computer connected through a network. Patent Document 1 and Patent Document 2 disclose techniques that make it possible to check settings of a remote device from a personal computer and/or to change the settings from the personal computer. Through such functions, users can manipulate the device without actually going to the location of the device and actually operating the device.

[Patent Document 1] Japanese Patent Application Publication No. 2002-232635

[Patent Document 2] Japanese Patent Application Publication No. 2002-281195

Despite these, it is still hard to say that collaboration between the devices and personal computers is sufficient. As a case in point, it is not possible to issue a print instruction from the operation panel of a multifunction peripheral to print a document stored in a personal computer, or to edit such a document from the operation panel of the multifunction peripheral. Because of this, after issuing a print instruction from a personal computer, the user may go to the location of the device and may take a look at the printed document, only to come back to the personal computer to finish his/her work upon noticing that the print setting was wrong or that there is a typographical error or the like. Namely, the problem is that the user may need to go back and forth between the personal computer and the device.

A technology is available that provides for documents stored in a multifunction peripheral or in a document management system associated with the multifunction peripheral to be printed from the multifunction peripheral. This technology, however, has a problem in that a document stored in a user personal computer cannot be printed immediately when such printing unexpectedly becomes necessary.

Accordingly, there is a need for an information processing system, a device, an information processing apparatus, an information processing method, an information processing program and record medium, which can reduce inconvenience relating to the distance between a device such as a printer, scanner or FAX and an information processing apparatus connected to the device via a network.

SUMMARY

In an aspect of this disclosure, there is provided an information processing system, which includes a device having a printing unit, and an information processing apparatus connected to the device via a network, wherein the device includes a display screen sharing client unit configure to acquire data of a display screen displayed at the information processing apparatus and to display the data of the display screen on a display unit of the device, thereby sharing the display screen with the information processing apparatus, and wherein the information processing apparatus includes a display screen sharing server unit configured to supply the data of the display screen displayed at the information processing apparatus to the device, and a print setting unit configured to acquire, through a network, printing unit usage information necessary to use the printing unit in response instruction from the device, and to spontaneously make a setting necessary to cause the printing unit to print document data stored in the information processing apparatus in response to the printing unit usage information.

According to the information processing system as described above, the display screen of the information processing apparatus can be shared on the display unit of the above-noted device. Further, the information processing apparatus can spontaneously make such a setting as to use the printing unit of the device. With this provision, it is possible to cause a document stored in the information processing apparatus to be printed or the like by operating the device at the location of the device.

In another aspect of this disclosure, there are provided the device and the information processing apparatus for use in the information processing system described above, and also an information processing method for use in the information processing apparatus or in the information processing system.

Further, there is provided in another aspect a record medium having a program. embodied therein for causing a computer to perform processes of the information processing apparatus.

According to at least one embodiment of the present invention, an information processing system, a device, an information processing apparatus, an information processing method, an information processing program and record medium are provided so as to reduce inconvenience relating to the distance between the device such as a printer, scanner, or FAX and the information processing apparatus connected to the device via a network.

BRIEF DESCRIPTION OF THE DRAWINGS

Other aspects, features and advantages will be apparent from the following detailed description when read in conjunction with the accompanying drawings wherein:

FIG. 6 is a drawing showing an example of a script for use in printer sharing;

DESCRIPTION OF THE PREFERRED EMBODIMENTS

Figure 1:
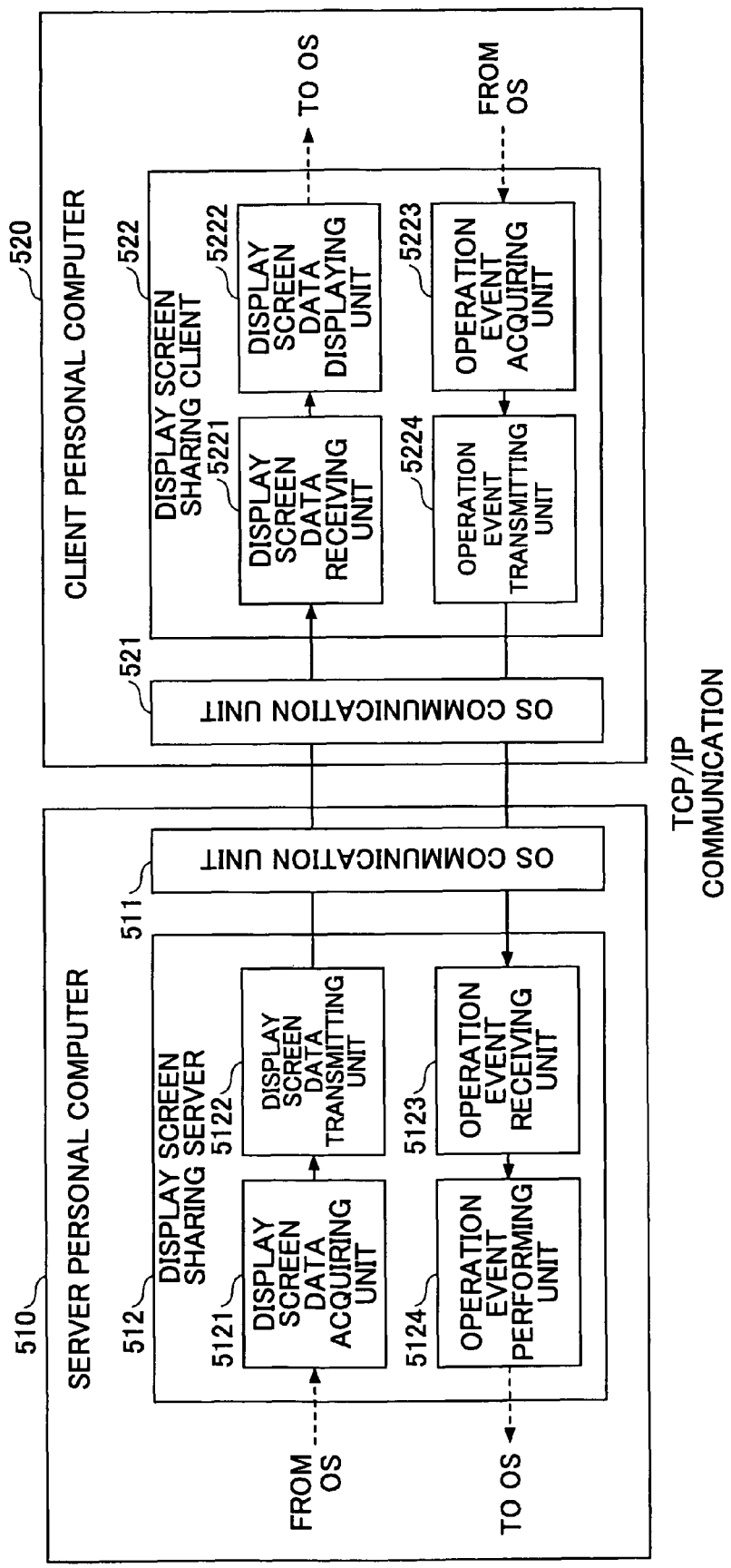
FIG. 1 is a drawing for explaining the operation principle of VNC.

In the following, embodiments of the present invention will be described with reference to the accompanying drawings. In these embodiments, the technology referred to as VNC (Virtual Network Computing) is utilized. VNC is a technology that makes it possible to remotely control the display screen of another computer that is connected through a network FIG. 1 is a drawing for explaining the operation principle of VNC. In FIG. 1, a server personal computer 510 and a client personal computer 520 are connected to each other via a network such as a LAN (local area network). The server personal computer 510 has a display screen sharing server 512 installed therein, and the client personal computer 520 has a display screen sharing client 522 installed therein.

The display screen sharing server 512 is software that serves to provide data indicative of a display screen presented on the display device of the server personal computer 510 to the client personal computer 520. The display screen sharing server 512 provides the functions of a display screen data acquiring unit 5121, a display screen data transmitting unit 5122, an operation event receiving unit 5123, and an operation event performing unit 5124.

The display screen sharing client 522 is software that serves to display, on the display device of the client personal computer 520, data indicative of a display screen presented on the display device of the server personal computer 510. The display screen sharing client 522 provides the functions of a display screen data receiving unit 5221, a display screen data displaying unit 5222, an operation event acquiring unit 5223, and an operation event transmitting unit 5224.

An OS communication unit 511 of the server personal computer 510 and an OS communication unit 521 of the client personal computer 520 are provided by the respective operating systems. The OS communication unit 511 and the OS communication unit 521 are program modules that serve to provide communication according to a predetermined protocol (e.g., TCP/IP).

Data indicative of a display screen presented on the display device of the server personal computer 510 is acquired by the display screen data acquiring unit 5121 through the operating system, and is then transmitted to the display screen sharing client 522 by the display screen data transmitting unit 5122.

In the client personal computer 520, the display screen data receiving unit 5221 receives the display screen data from the display screen sharing server 512. The display screen data displaying unit 5222 then displays the display screen data on the display device of the client personal computer 520.

An input may be entered by use of a mouse or keyboard on the display screen presented at the client personal computer 520. In such a case, the operation event acquiring unit 5223 detects the relevant operation event, and the operation event transmitting unit 5224 transmits the operation event to the display screen sharing server 512.

In the server personal computer 510, the operation event receiving unit 5123 receives the operation event from the display screen sharing client 522. The operation event performing unit 5124 notifies the OS (operating system) of the operation event.

With this provision, it is possible to operate the display screen of the server personal computer 510 at the client personal computer 520. As a result, a use at the client personal computer 520 can operate an application that is running on the server personal computer 510, for example.

When the display screen sharing server 512 acquires and transmits display screen data, only the data indicative of a display screen differential, rather than data indicative of the entire display screen, may be acquired and transmitted. This reduces the size of transmitted data and the processing load on the display screen sharing client 522, thereby achieving high-speed operation.

In the following, the term "display screen sharing server" and the term "display screen sharing client" used in the embodiments are intended to refer to software modules having substantially the same functions as the display screen sharing server 512 and the display screen sharing client 522, respectively.

Figure 2:
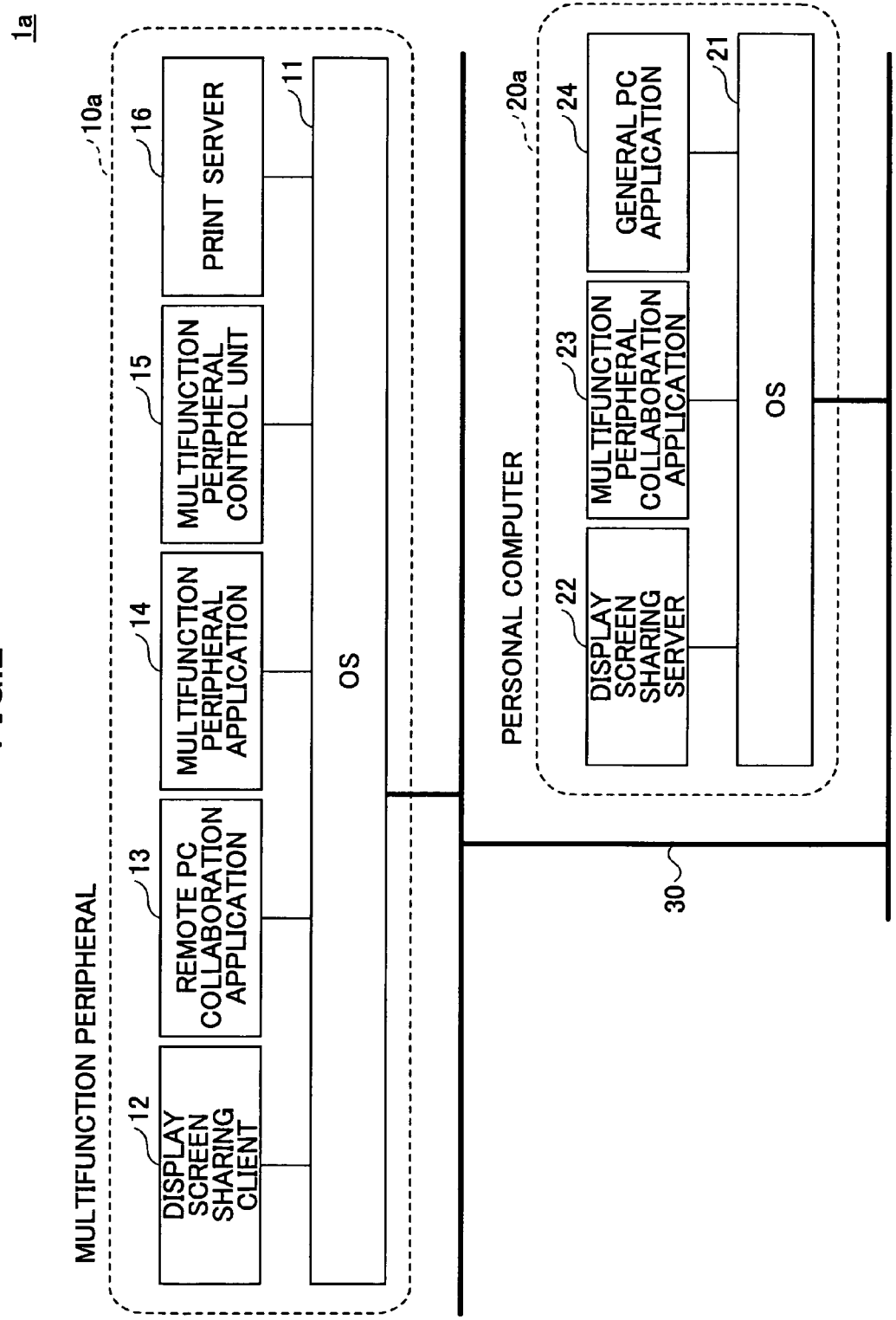
FIG. 2 is a drawing showing an example of the configuration of an information processing system according to a first embodiment.

FIG. 2 is a drawing showing an example of the configuration of an information processing system according to a first embodiment. In FIG. 2, an information processing system 1a includes a multifunction peripheral 10a and a personal computer 20a connected to each other via a network 30 (which can be either wired or wireless) such as a LAN (local area network) or the Internet.

The multifunction peripheral 10a is a multifunctional image input/output device having a scanner function, a printer function, a FAX function, a copy function, etc. On the multifunction peripheral 10a, an operating system 11 providing GUI (graphical user interface) such as Windows (registered trademark), 2000Embedded, or Windows XPEmbedded is running. A display screen sharing client 12, a remote PC collaboration application 13, a multifunction peripheral application 14, a multifunction peripheral control unit 15, and a print server 16 are running on the operating system 11.

The display screen sharing client 12 serves to share, on the operation panel of the multifunction peripheral 10a, the display screen presented on the display screen of the personal computer 20a.

The remote PC collaboration application 13 serves to collaborate with the display screen sharing client 12 to communicate with the personal computer 20a subjected to remote control. The remote PC collaboration application 13 also serves to control multifunction peripheral 10a.

The multifunction peripheral application 14 provides various services to allow a user to operate the multifunction peripheral 10a.

The multifunction peripheral control unit 15 is software that controls an image input device (i.e., scanner unit), an image output device (i.e., printer unit), and a device for providing the FAX function, which are embedded in the multifunction peripheral 10a.

The print server 16 is software that controls the printer driver of the multifunction peripheral 10a, and that enables printer sharing such as to allow the personal computer 20a and the like to use the printer function of the multifunction peripheral 10a as a network printer. Here, printer sharing refers to the function that allows a printer connected via a network to be operated as if it is directly connected to the local apparatus. Such function is referred to as "print server" according to the terminology used for Microsoft Windows OS (registered trademark). A user having an access right using a personal computer connected to the network can use the print server to use the printer driver without going through the trouble of installing the driver. In the present embodiment, this function will be utilized.

At the personal computer 20a, a display screen sharing server 22, a multifunction peripheral collaboration application 23, a general PC application 24, and so on are running on the operating system 21 such as Windows.

The display screen sharing server 22 serves to allow the display screen presented on the display device of the personal computer 20a to be shared on the operation panel of the multifunction peripheral 10a.

The multifunction peripheral collaboration application 23 serves to control the personal computer 20a in response to instruction from the remote PC collaboration application 13.

The general PC application 24 includes various applications that are generally used such as document applications, spread sheet applications, etc.

Figure 3:
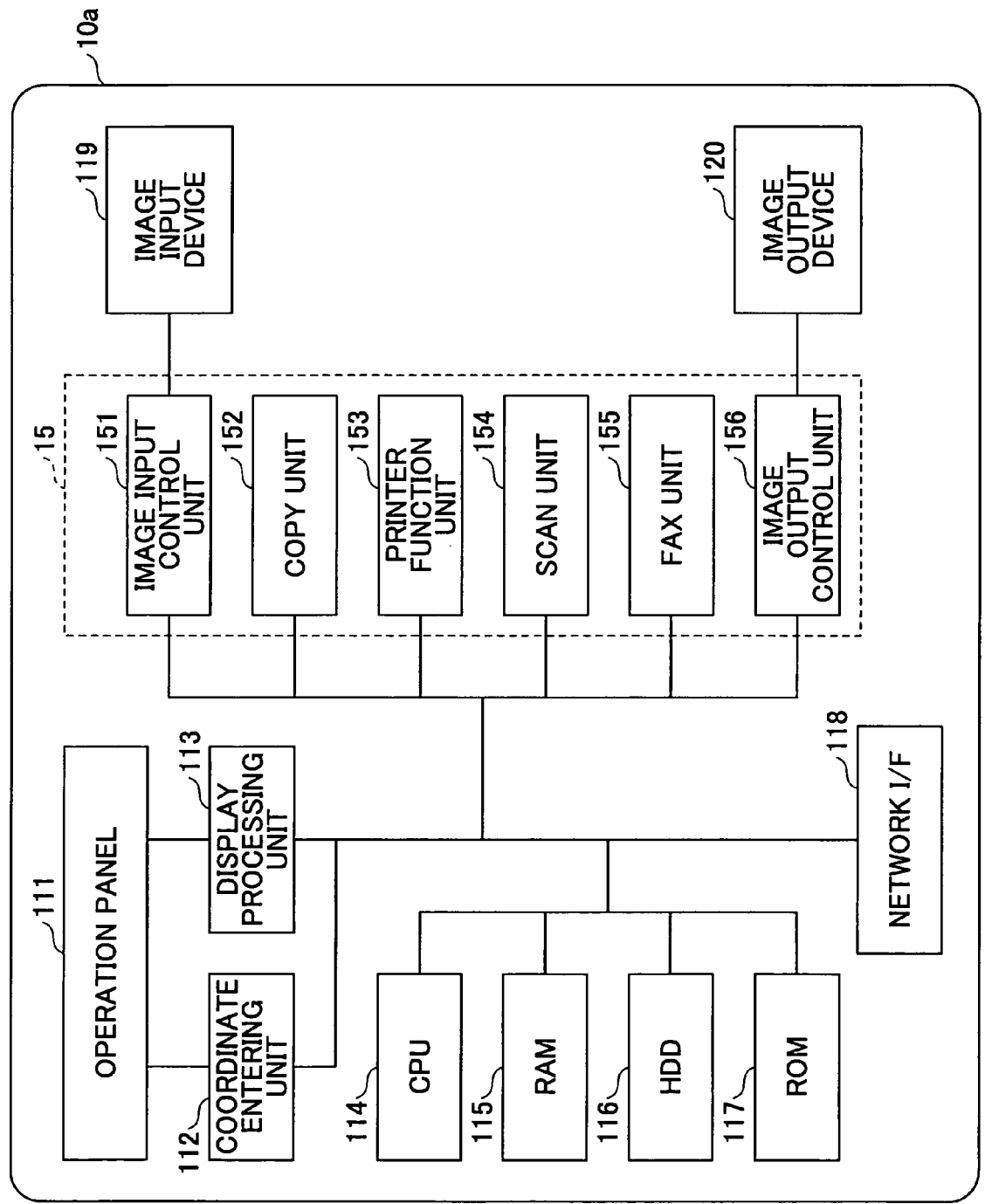
FIG. 3 is a drawing showing an example of the hardware configuration of a multifunction peripheral according to the embodiment of the present invention.

FIG. 3 is a drawing showing an example of the hardware configuration of the multifunction peripheral according to the embodiment of the present invention. In FIG. 3, the multifunction peripheral 10a includes an operation panel 111, a CPU 114, a RAM 115, an HDD 116, a ROM 117, a network I/F 118, an image input device 119, and an image output device 120, which are hardware components, and further includes a coordinate entering unit 112, a display processing unit 113, and the multifunction peripheral control unit 15, which are software components.

The operation panel 111 provides a means to present information to users via a GUI interface and provides an operating means. The operation panel 111 is provided with a touch panel, which allows coordinates to be entered. The operation panel 111 may further be provided with an input means such as a mouse and keyboard. The operation panel 111 may be provided with a VGA liquid crystal display panel, for example.

The coordinate entering unit 112 is a program that controls processing in response to the coordinates entered through the touch panel. The display processing unit 113 is a program that controls displaying on the VGA liquid crystal display panel.

The CPU 114 executes various programs stored in the HDD 116 or the ROM 117 to provide various functions of the multifunction peripheral 10a. The RAM 114 is used as a storage to which programs are loaded at the time of execution, and is also used as a work memory area when the CPU 114 executes programs. The HDD 116 and the ROM 117 store the programs. The HDD 116 also stores image data that are scanned by the image input device 119. The network I/F 118 is used as the interface that provides connection with the network 30 shown in FIG. 2.

The image input device 119 is a scanner unit, which scans image data from a document. The image output device 120 is a printer unit, which prints image data scanned by the image input device 119 or image data stored in the HDD 116.

The multifunction peripheral control unit 15 controls the image input device 119 and the image output device 120. The multifunction peripheral control unit 15 includes an image input control unit 151, a copy unit 152, a printer function unit 153, a scan unit 154, a FAX unit 155, and an image output control unit 156.

The image input control unit 151 and the image output control unit 156 are driver software for the image input device 119 and the image output device 120, respectively. The copy unit 152, the printer function unit 153, the scan unit 154, and the FAX unit 155 are the functions that control a copy process, a print process, a scan process, and a FAX transmission/reception process, respectively.

Figure 4:
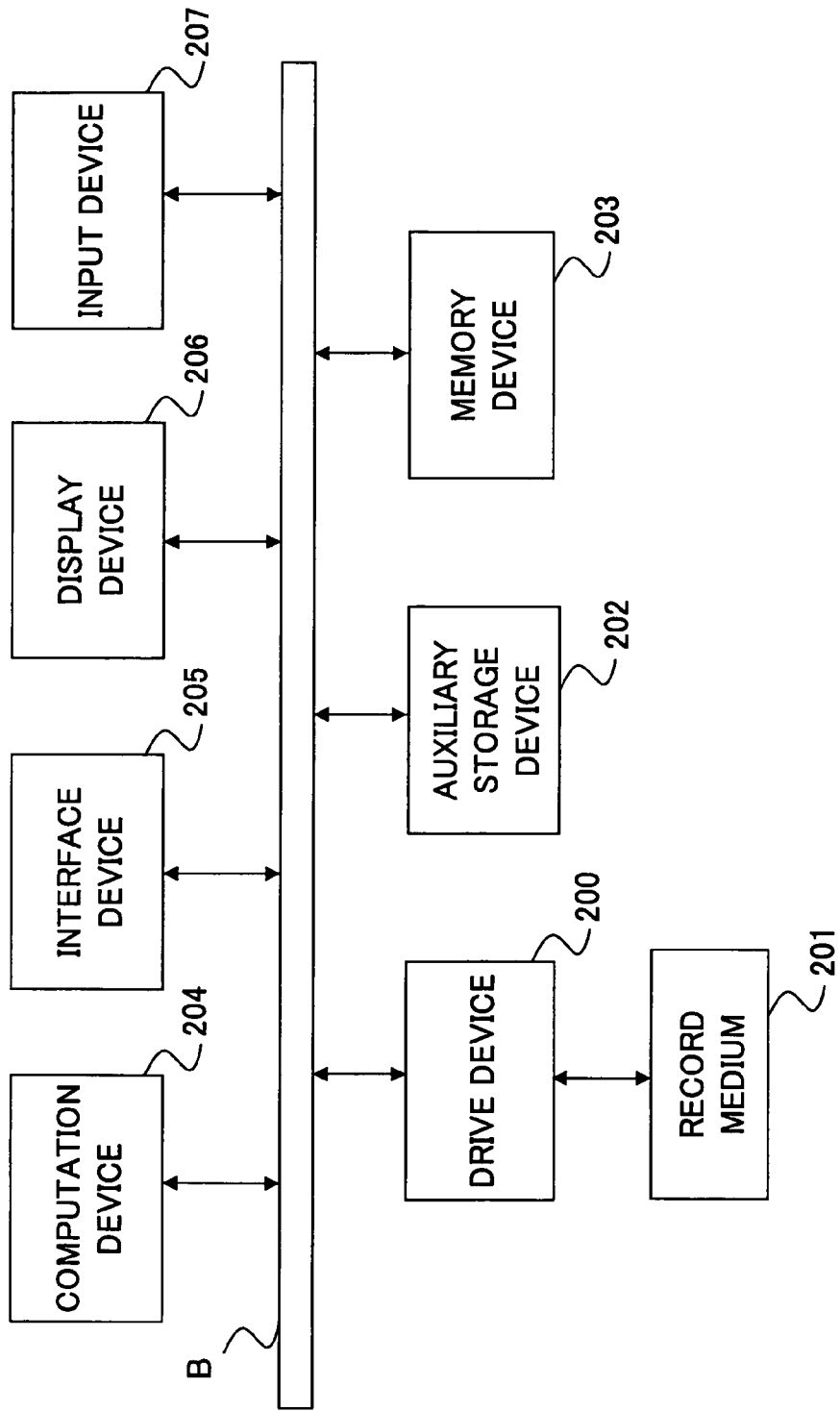
FIG. 4 is an example of the hardware configuration of a personal computer according to the embodiment of the present invention.

FIG. 4 is an example of the hardware configuration of the personal computer according to the embodiment of the present invention. The personal computer 20a shown in FIG. 4 includes a drive device 200, an auxiliary storage device 202, a memory device 203, a computation device 204, an interface device 205, a display device 206, and an input device 207, which are connected to one another via a bus B.

Programs for implementing processes on the personal computer 20a are provided on a record medium 201 such as a CD-ROM. The record medium 201 having the programs recorded thereon is set in the drive device 200, and, then, the programs are installed from the record medium 201 to the auxiliary storage device 202 via the drive device 200.

The auxiliary storage device 202 stores therein the installed programs, and also stores files and data. For example, the auxiliary storage device 202 has various tables stored therein that are necessary for program execution. Such tables will later be described.

The memory device 203 stores therein a program read from the auxiliary storage device 202 upon the instruction to execute the program. The computation device 204 performs the functions relating to the personal computer 20a in accordance with the program stored in the memory device 203. The interface device 205 is used as the interface that provides connection with the network 30 shown in FIG. 2.

The display device 206 displays a GUI or the like based on programs. The input device 207 may include a keyboard and mouse, and is used to enter various operation instructions.

The hardware configuration shown in FIG. 3 and FIG. 4 are also used in other embodiments in addition to the first embodiment.

Figure 5:
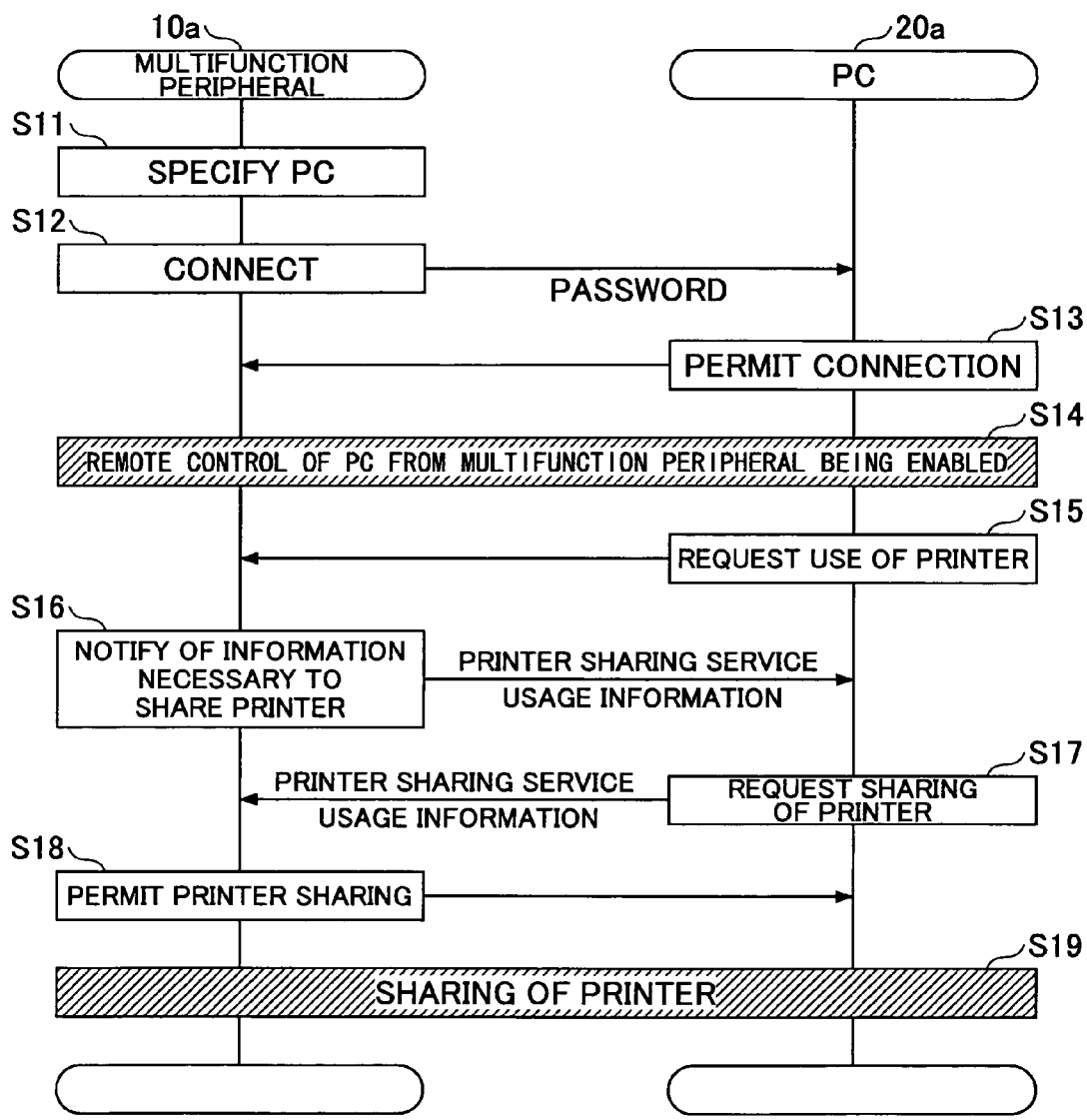
FIG. 5 is a drawing showing an operating procedure of the information processing system according to the first embodiment.

In the following, a description will be given of an operating procedure of the information processing system 1a shown in FIG. 2. FIG. 5 is a drawing showing an operating procedure of the information processing system according to the first embodiment. In FIG. 5, the user is supposed to be working at the multifunction peripheral 10a.

The user operates the operation panel 111 of the multifunction peripheral 10a to activate the display screen sharing client 12. The user specifies the IP address of his/her personal computer (i.e., the personal computer 20a) as the destination of display screen sharing (S11). In response, the display screen sharing client 12 is connected to the display screen sharing server 22 that is running on the personal computer 20a (S12) In so doing, authentication based on a password or the like may be preferably required so as to prevent his/her personal computer from being remotely controlled by another user. In such a case, the user may enter the password or the like for authentication by use of buttons provided on the multifunction peripheral 10a or the operation panel 111 of the multifunction peripheral 10a.

In order to avoid the trouble of entering the IP address of the personal computer and the password or the like by use of the buttons or operation panel of the multifunction peripheral 10a, an authentication system utilizing an IC card or a RFID (Radio Frequency Identification System) may be used. For example, an IC card has the recorded IP address of the personal computer and the recorded password for display screen sharing. When the IC card is inserted into the IC card reader of the multifunction peripheral 10a, the display screen sharing client 12 retrieves, from the IC card, information necessary to connect with the display screen sharing server 22 of the personal computer 20a.

When the connection for display screen sharing is established, the display screen of the personal computer 20a is presented on the operation panel 111 of the multifunction peripheral 10a. The user is thus able to use the touch panel attached to the operation panel 111 or the mouse and keyboard connected to the multifunction peripheral 10a to remotely control the personal computer 20a (S14).

When the personal computer 20a is remotely controlled from the multifunction peripheral 10a, the display screen of the personal computer 20a can be presented not only at the same magnification but also at reduced magnification conforming to the size of the display screen of the operation panel 111 of the multifunction peripheral 10a. Switching between different magnifications may be made possible. Such function is also provided by display screen sharing software complying with VNC or the like.

Thereafter, the user remotely controls the personal computer 20a from the multifunction peripheral 10a to activate the multifunction peripheral collaboration application 23 on the personal computer 20a. In response, the display screen of the multifunction peripheral collaboration application 23 is presented on the operation panel 111. The user then calls up the function of the multifunction peripheral collaboration application 23 that serves to request the use of the printer function. In response, the multifunction peripheral collaboration application 23 communicates with the remote PC collaboration application 13 of the multifunction peripheral 10a, and inquires about information necessary for printer sharing (S15).

The remote PC collaboration application 13 of the multifunction peripheral 10a sends the information necessary to use the print server 16 (hereinafter referred to as "print server usage information") as a response (S16). The print server usage information includes the IP address of the multifunction peripheral 10a, the printer identifier of the multifunction peripheral 10a, etc.

Upon receiving the print server usage information, the multifunction peripheral collaboration application 23 of the personal computer 20a establishes a connection with the print server 16 spontaneously based on the print server usage information (S17, S18). The display screen sharing client 12 sets, as a shared printer, the printer driver of the multifunction peripheral 10a to which the display screen sharing client 12 is connected (S19).

The sharing of the printer of the multifunction peripheral 10a (S17 through S19) may as well be performed by receiving a script as the print server usage information, and then causing the multifunction peripheral collaboration application 23 to perform the script.

FIG. 6 is a drawing showing an example of the script for use in printer sharing. The script of FIG. 6 describes a program that serves to use the print-permitted user right (user name "PrintGuest" & password "PASSWD") to share the printer that is a multifunction peripheral 10a having the IP address "XXX.XXX.XXX.XXX" and that is registered as having the identifier "PRINTERABCD" (S1, S2). The program also serves to set the above-noted printer as a default printer (S3).

When the sharing of the printer is enabled, the user can open and edit a document stored in the personal computer 20a by use of an application from the operation panel 111 of the multifunction peripheral 10a, or send a print instruction. Namely, while staying by the multifunction peripheral 10a, the user can arrange for the personal computer 20a to send a print instruction, thereby being able to check the results of printing on the spot.

Thereafter, the sharing of the display screen may be disabled. In such a case, the multifunction peripheral collaboration application 23 may disable the setting that selects the printer as the default printer. Further, the multifunction peripheral collaboration application 23 may check whether the printer driver of the multifunction peripheral 10a under the remote control has already been installed in the personal computer 20a. Such a check may be made by comparing the IP address of the printer installed in the personal computer 20a with the IP address of the multifunction peripheral 10a currently connected. If the printer driver of the multifunction peripheral 10a is already installed in the personal computer 20a, such already-installed printer driver of the multifunction peripheral 10a may be selected as a default printer, rather than enabling the sharing of the printer.

As described above, according to the information processing system 1a of the first embodiment, the personal computer 20a can be remotely controlled by sharing the display screen at the multifunction peripheral 10a. Further, even if the driver of the multifunction peripheral 10a has not yet been installed in the personal computer 20a, printing is possible by instantly enabling printer sharing via remote control. Accordingly, the user does not have to go back to his/her desk to operate the personal computer 20a, and can edit and print a document stored in the personal computer 20a while staying by the multifunction peripheral 10a situated at some distance from his/her desk.

In connection with FIG. 5, a description has been given of the procedure according to which the user manually calls up the function of the multifunction peripheral collaboration application 23 to request the use of the printer function after the sharing of display screen is enabled (S15). Alternatively, the multifunction peripheral collaboration application 23 may automatically make the request to use the printer function in response to the sharing of display screen. Further, the personal computer 20a that can be remotely controlled may include a terminal client of Microsoft Windows Terminal Server and a terminal of Citrix Access Suite.

Figure 7:
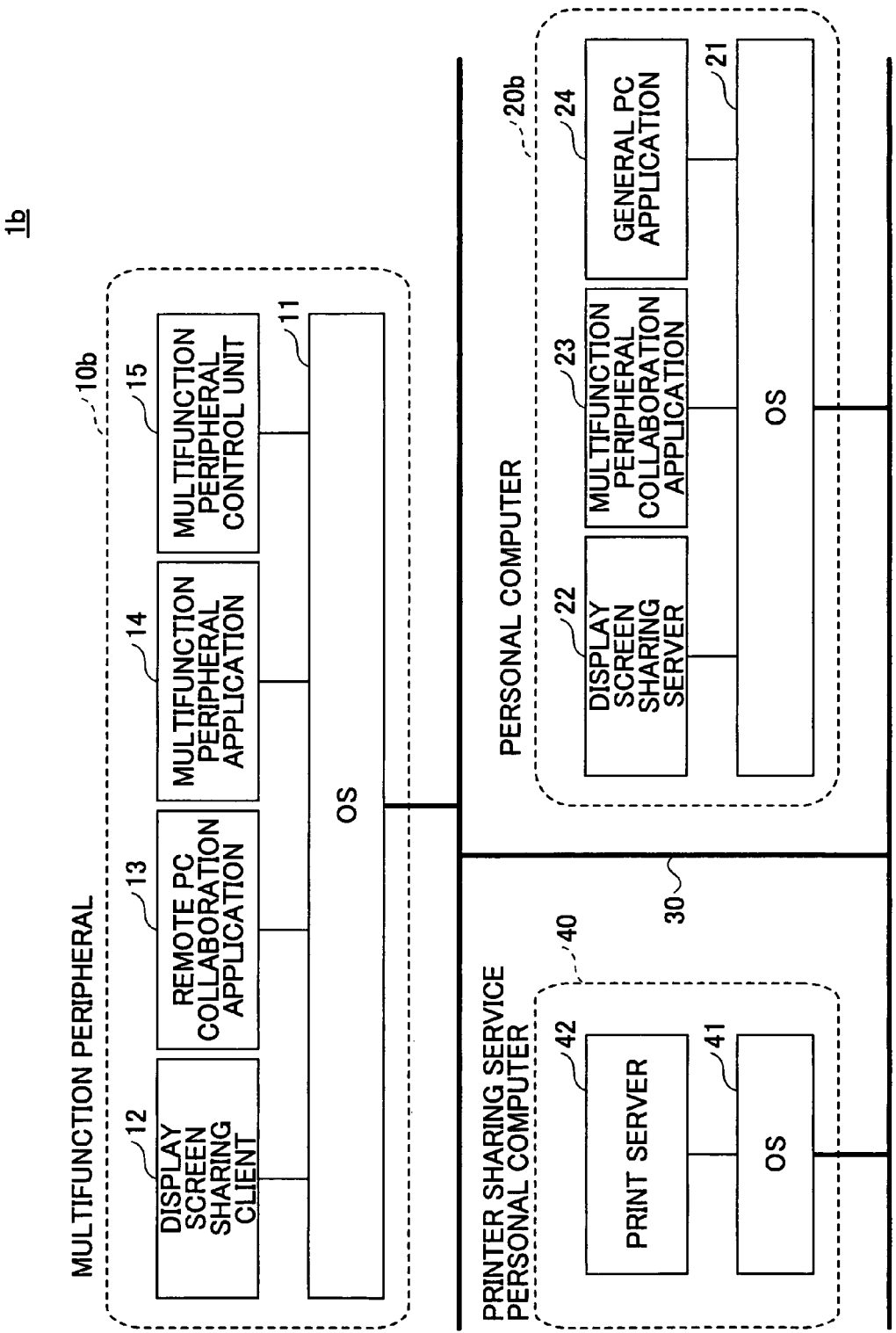
FIG. 7 is a drawing showing an example of the configuration of an information processing system according to a second embodiment.

In the following, a second embodiment will be described. FIG. 7 is a drawing showing an example of the configuration of an information processing system according to the second embodiment. In FIG. 7, the same elements as those of FIG. 2 are referred to by the same numerals, and a description thereof will be omitted.

In an information processing system 1b shown in FIG. 7, a printer sharing service personal computer 40 is connected to the network 30. In the printer sharing service personal computer 40, a print server 42 providing the same functions that the print server 16 of the first embodiment provides is running on an operating system 41. Namely, the print server 42 is software that controls the printer driver of a multifunction peripheral 10b to enable printer sharing such that the printer function of the multifunction peripheral 10a is available as a network printer to a personal computer 20b and the like. Accordingly, the multifunction peripheral 10b does not necessarily require the print server 16, which is indicated by the absence of the print server 16 in FIG. 7.

Figure 8:
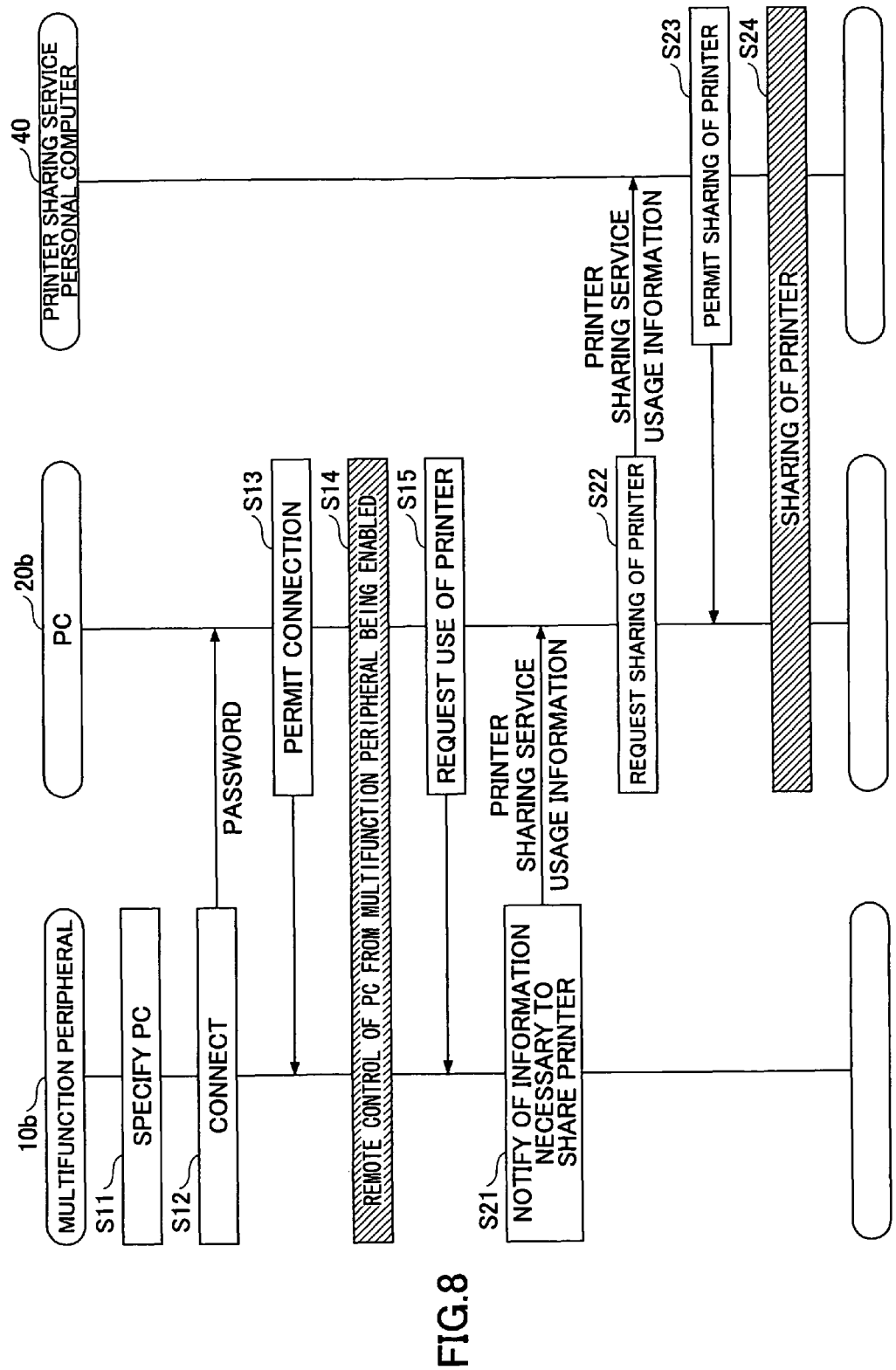
FIG. 8 is a drawing showing an operating procedure of the information processing system according to the second embodiment.

FIG. 8 is a drawing showing an operating procedure of the information processing system according to the second embodiment. In FIG. 8, the same steps as those of FIG. 5 are referred to by the same numerals, and a description thereof will be omitted.

In FIG. 8, the procedure following step S21 differs from that of FIG. 5. The multifunction peripheral collaboration application 23 communicates with the remote PC collaboration application 13 to inquire about information necessary for printer sharing (S15). In response, the remote PC collaboration application 13 of the multifunction peripheral 10b sends print server usage information (which could be a script as shown in FIG. 6) as a response (S21). The print server usage information includes the IP address of the printer sharing service personal computer 40 that shares the local printer driver, the identifier of a registered local printer, etc.

Upon receiving the print server usage information, the multifunction peripheral collaboration application 23 of the personal computer 20b establishes a connection with the print server 42 of the printer sharing service personal computer 40 spontaneously based on the print server usage information (S22, S23). The printer driver of the multifunction peripheral 10a that is installed in the printer sharing service personal computer 40 is selected as a shared printer (S24).

When the sharing of the printer is enabled, the user can open and edit a document stored in the personal computer 20b by use of an application from the operation panel 111 of the multifunction peripheral 10b, or can send a print instruction. Namely, while staying by the multifunction peripheral 10b, the user can arrange for the personal computer 20b to send a print instruction, thereby being able to check the results of printing on the spot. Other aspects are the same as in the first embodiment.

In the following, a third embodiment will be described. The system configuration of the third embodiment is the same as that shown in FIG. 7. It should be noted, however, that the printer sharing service personal computer 40 is not necessarily required.

Figure 9:
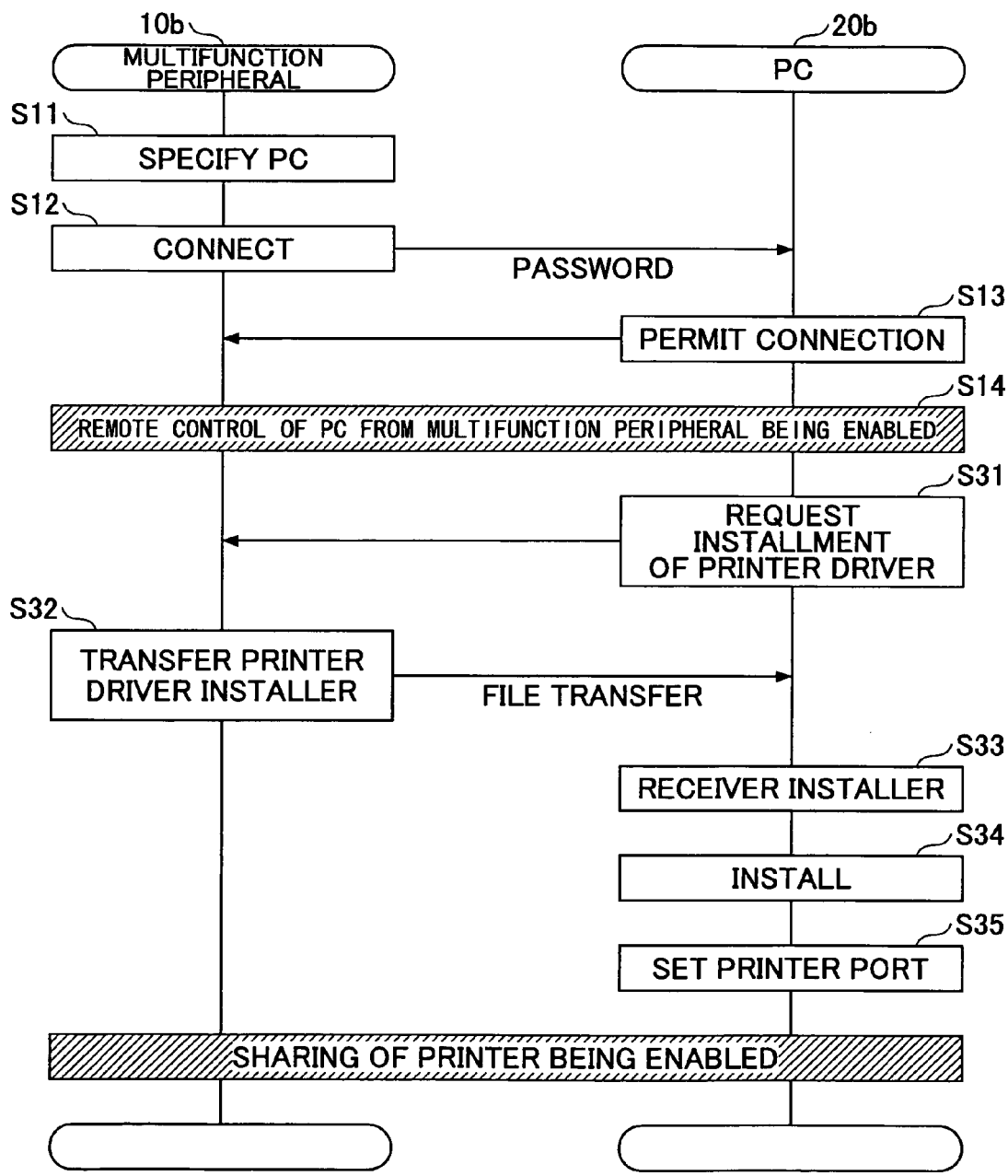
FIG. 9 is a drawing showing an operating procedure of the information processing system according to a third embodiment.

FIG. 9 is a drawing showing an operating procedure of the information processing system according to the third embodiment. In FIG. 9, the same steps as those of FIG. 8 are referred to by the same numerals, and a description thereof will be omitted.

In FIG. 9, the procedure following step S31 differs from that of FIG. 8. Upon the establishment of display screen sharing (S14), the user remotely controls the personal computer 20b from the multifunction peripheral 10b to display the display screen of the multifunction peripheral collaboration application 23, and instructs the multifunction peripheral collaboration application 23 to install the printer driver of the multifunction peripheral 10b. In response to the user instruction, the multifunction peripheral collaboration application 23 requests the remote PC collaboration application 13 running on the multifunction peripheral 10b to send the installer of the printer driver (S31).

When the remote PC collaboration application 13 transfers the installer of the printer driver (S32), the multifunction peripheral collaboration application 23 having received the installer activates the installer spontaneously, thereby starting to install the printer driver in the personal computer 20b, and then waiting for the completion of the install (S33, S34). Upon detecting the completion of the installment of the printer driver, the multifunction peripheral collaboration application 23 makes a setting to the printer port (S35). Namely, the TCP/IP port is set to the IP address of the multifunction peripheral 10b to which a connection is currently maintained, thereby making it possible to print to the printer of the multifunction peripheral 10b.

When the printer driver is installed, the user can open and edit a document stored in the personal computer 20b by use of an application from the operation panel 111 of the multifunction peripheral 10b, or can send a print instruction. Namely, while staying by the multifunction peripheral 10b, the user can arrange for the personal computer 20b to send a print instruction, thereby being able to check the results of printing on the spot.

As described above, according to the information processing system 1b of the third embodiment, the multifunction peripheral 10b is provided with an installer for the printer driver and the files and the like necessary for settings to be made. Even when the multifunction peripheral 10b is used for the first time by the personal computer 20b, thus, printing can be easily performed via remote control from the personal computer 20b.

Figure 10:
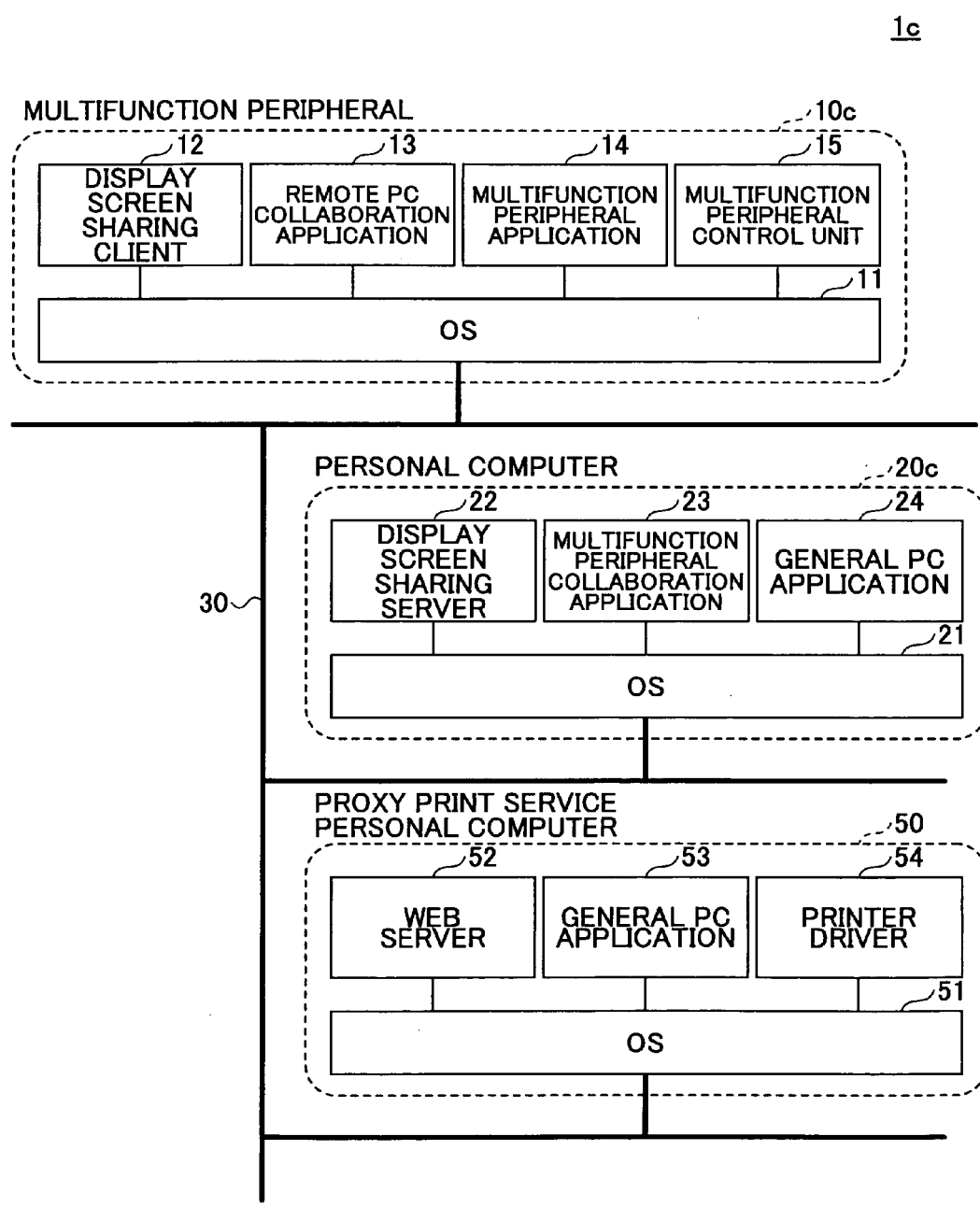
FIG. 10 is a drawing showing an example of the configuration of an information processing system according to a fourth embodiment.

In the following, a fourth embodiment will be described. FIG. 10 is a drawing showing an example of the configuration of an information processing system according to the fourth embodiment. In FIG. 10, the same elements as those of FIG. 2 are referred to by the same numerals, and a description thereof will be omitted.

In the information processing system 1c shown in FIG. 10, a proxy print service personal computer 50 is connected to the network 30. The proxy print service personal computer 50 has a Web server 52, a general PC application 53, and a printer driver 54 for the printer of a multifunction peripheral 10c installed on an operating system 51. The Web server 52 is a Web server program, and activates a process in response to a HTTP-based request. The general PC application 53 may be various document applications or the like, which are similar to the general PC application 24 of a personal computer 20c.

The proxy print service personal computer 50 provides a proxy print service as a Web service, for example. The proxy print service refers to the service of sending a print instruction to a print destination in response to the reception of a document file to be printed and print setting information inclusive of an indication of the multifunction peripheral or printer by which a printout is to be produced, for example. A client of the proxy print service specifies the URL of a proxy print service by use of a Web browser to utilize the service. Namely, accessing the proxy print service by use of a Web browser allows a document file to be uploaded, a printer to be selected, and print settings such as the number of printed copies to be made, followed by requesting the proxy print service personal computer 50 to perform the requested print instruction.

In this example, the URL of the proxy print service is "http://server/print/". The proxy print service manages a URL separately for each printer. The URL for providing a service for use of a printer having the name "MFPABCD" is "http://server/print/MFPABCD/", for example. By the same token, the URL for providing a service for use of a printer having the name "XYZPRINTER" is "http://server/print/XYZ-PRINTER/".

Figure 11:
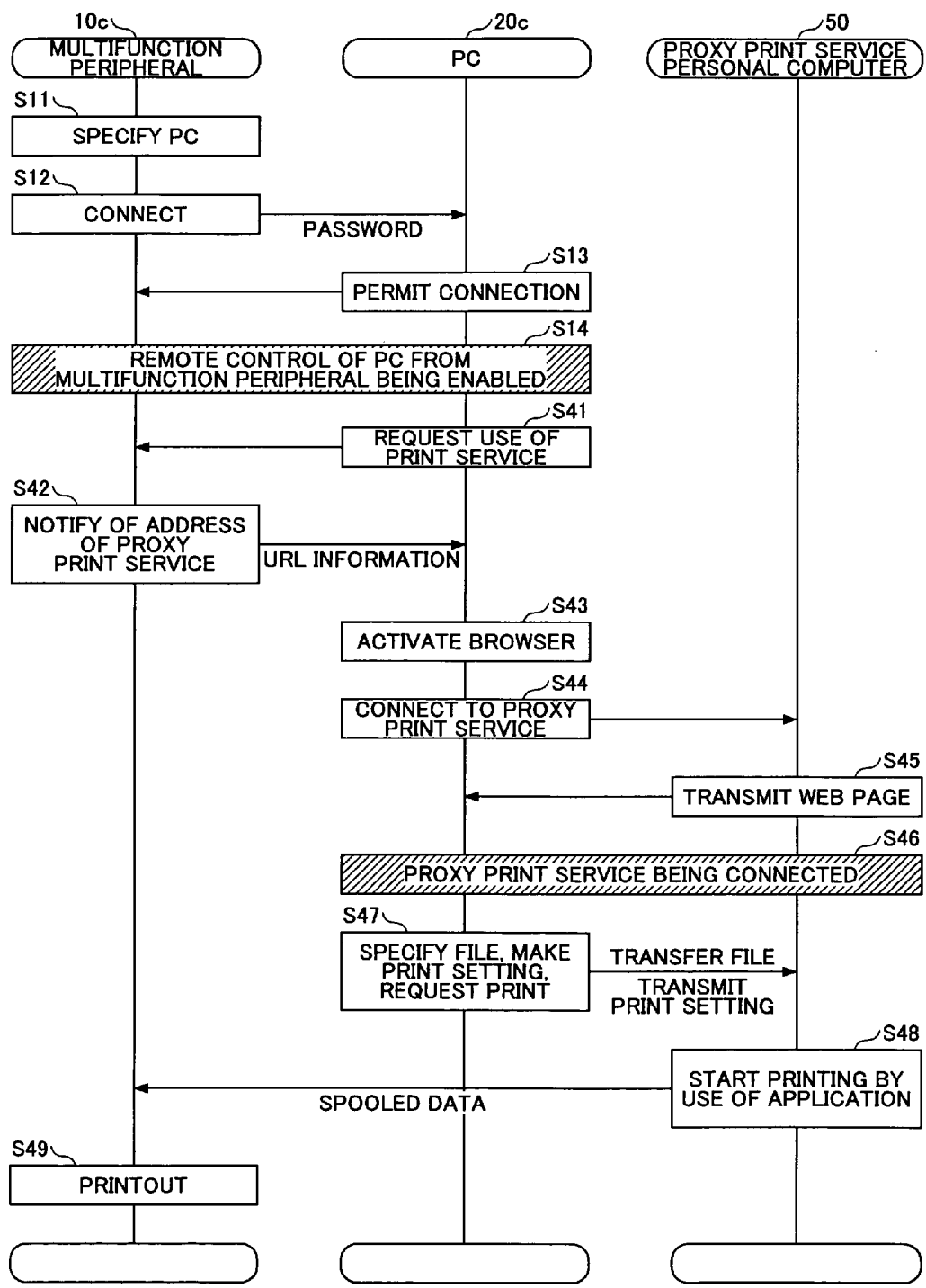
FIG. 11 is a drawing showing an operating procedure of the information processing system according to the fourth embodiment.

FIG. 11 is a drawing showing an operating procedure of the information processing system according to the fourth embodiment. In FIG. 11, the same steps as those of FIG. 5 are referred to by the same numerals, and a description thereof will be omitted as appropriate.

In FIG. 11, the procedure following step S41 differs from that of FIG. 5. Upon the establishment of display screen sharing (S14), the user remotely controls the personal computer 20c from the multifunction peripheral 10c to display the display screen of the multifunction peripheral collaboration application 23, and instructs the multifunction peripheral collaboration application 23 to utilize a proxy print service. In response to the user instruction, the multifunction peripheral collaboration application 23 sends a request to use a proxy print service to the remote PC collaboration application 13 running on the multifunction peripheral 10c (S41).

The remote PC collaboration application 13 sends information inclusive of the URL of a proxy print service (hereinafter referred to as "proxy print service usage information") as a response (S42). For example, the multifunction peripheral 10c may be managed under the identifier "MFPABCD" for providing a proxy print service. In this case, the remote PC collaboration application 13 sends the URL information "http://server/print/MFPABCD/" as a response.

In response to the reception of the URL, the multifunction peripheral collaboration application 23 spontaneously activates a Web browser by indicating the received URL. In response, the Web browser requests a connection with the specified URL (S44). In response to the request from the Web browser, the proxy print service personal computer 50 returns a Web page that is a display screen for print settings to be made with respect to the proxy print service (S45). This Web page is displayed by the Web browser, and also becomes operable from the operation panel 111 of the multifunction peripheral 10c (S46).

The user operates the operation panel 111 to specify a document file to be printed stored in the personal computer 20c and also to make print settings on the Web page, followed by requesting printing by clicking an "OK" button or the like on the Web page. In response to the print request, Web browser transmits the document file and the print setting information and the like to the proxy print service personal computer 50 (S47).

The proxy print service personal computer 50 sends a print instruction to an application corresponding to the document file that is specified as a file to be printed (S48). In response, print data is transmitted from the proxy print service personal computer 50 to the multifunction peripheral 10c, by which printing is then performed (S49).

In the above example, the user remotely controls the personal computer 20c from the multifunction peripheral 10c to manually request the use of a proxy print service from the multifunction peripheral collaboration application 23 (S41). Alternatively, the multifunction peripheral collaboration application 23 may spontaneously acquire the URL of the proxy print service in response to the establishment of display screen sharing, and may then activate the browser to access the proxy print service.

Further, the provision of the service in the form of a Web service is not an absolute requirement. A protocol for use of a proxy print service may be selected properly as a matter of design choice. Instead of the use of a Web browser, for example, the multifunction peripheral collaboration application 23 running on the personal computer may also serve as a client program that utilizes the proxy print service. In this case, the inclusion of the IP address or the like of the proxy print service personal computer 50 in the proxy print service usage information may suffice for the multifunction peripheral collaboration application 23 to identify the proxy print service personal computer 50.

As described above, according to the information processing system 1c of the fourth embodiment, the proxy print service personal computer 50 for providing a proxy print service is provided on the network 30, which makes it possible to print to the multifunction peripheral 10c on which the display screen sharing client 12 is running. With this provision, the user can use the proxy print service to print a document stored in the personal computer 20c to the multifunction peripheral 10c through remote control from the operation panel 111 of the multifunction peripheral 10c, without installing a printer driver to the personal computer 20c.

Figure 12:
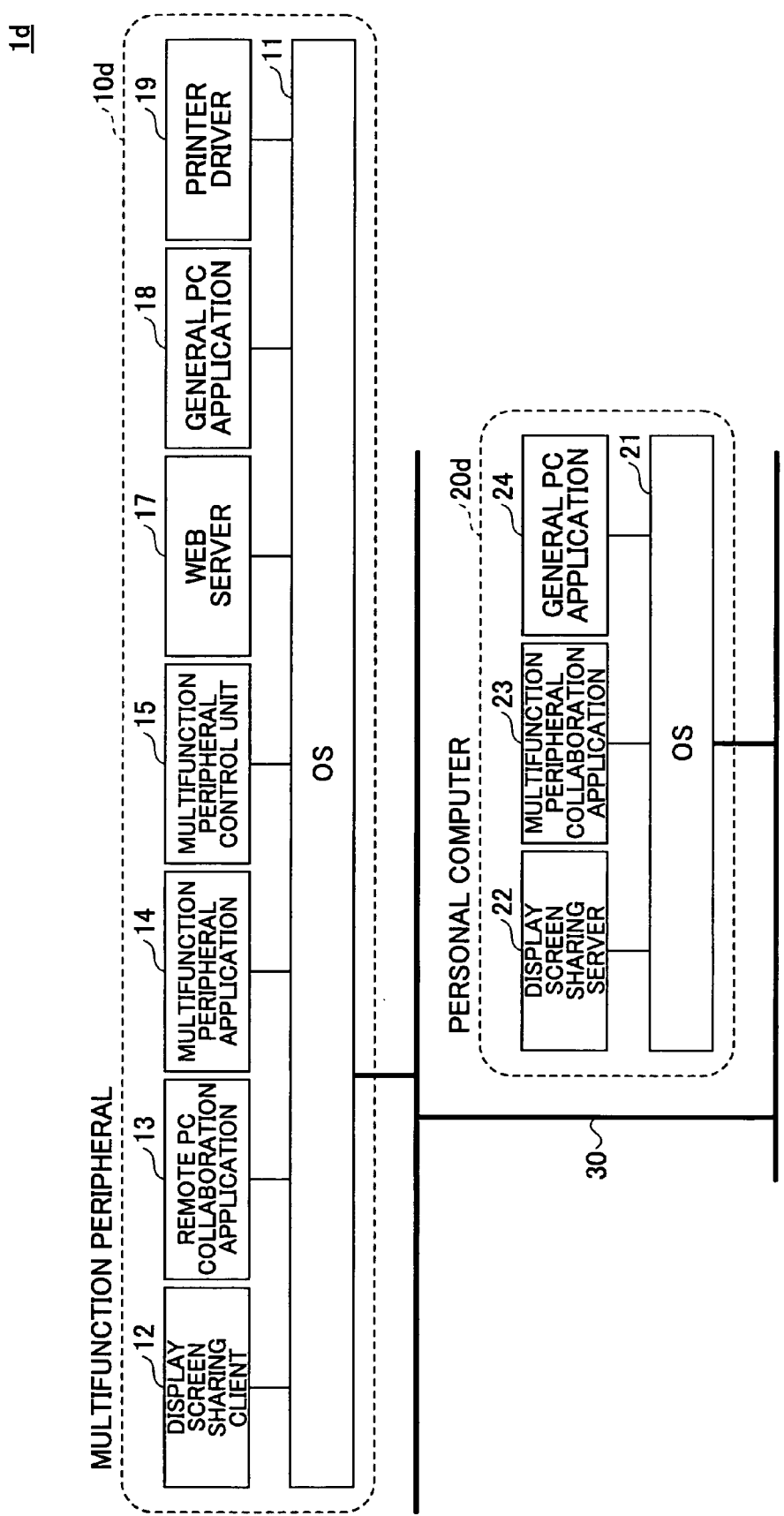
FIG. 12 is a drawing showing an example of the configuration of an information processing system according to a fifth embodiment.

In the following, a fifth embodiment will be described. FIG. 12 is a drawing showing an example of the configuration of an information processing system according to the fifth embodiment. In FIG. 12, the same elements as those of FIG. 10 are referred to by the same numerals, and a description thereof will be omitted.

In an information processing system id of FIG. 12, a multifunction peripheral 10d has a Web server 17, a general PC application 18, and a printer driver 19 additionally implemented thereon. These software components correspond to the Web server 52, the general PC application 53 and the printer driver 54, which were implemented on the proxy print service personal computer 50 in the fourth embodiment. Namely, the multifunction peripheral 10d provides a proxy print service in the fifth embodiment.

Figure 13:
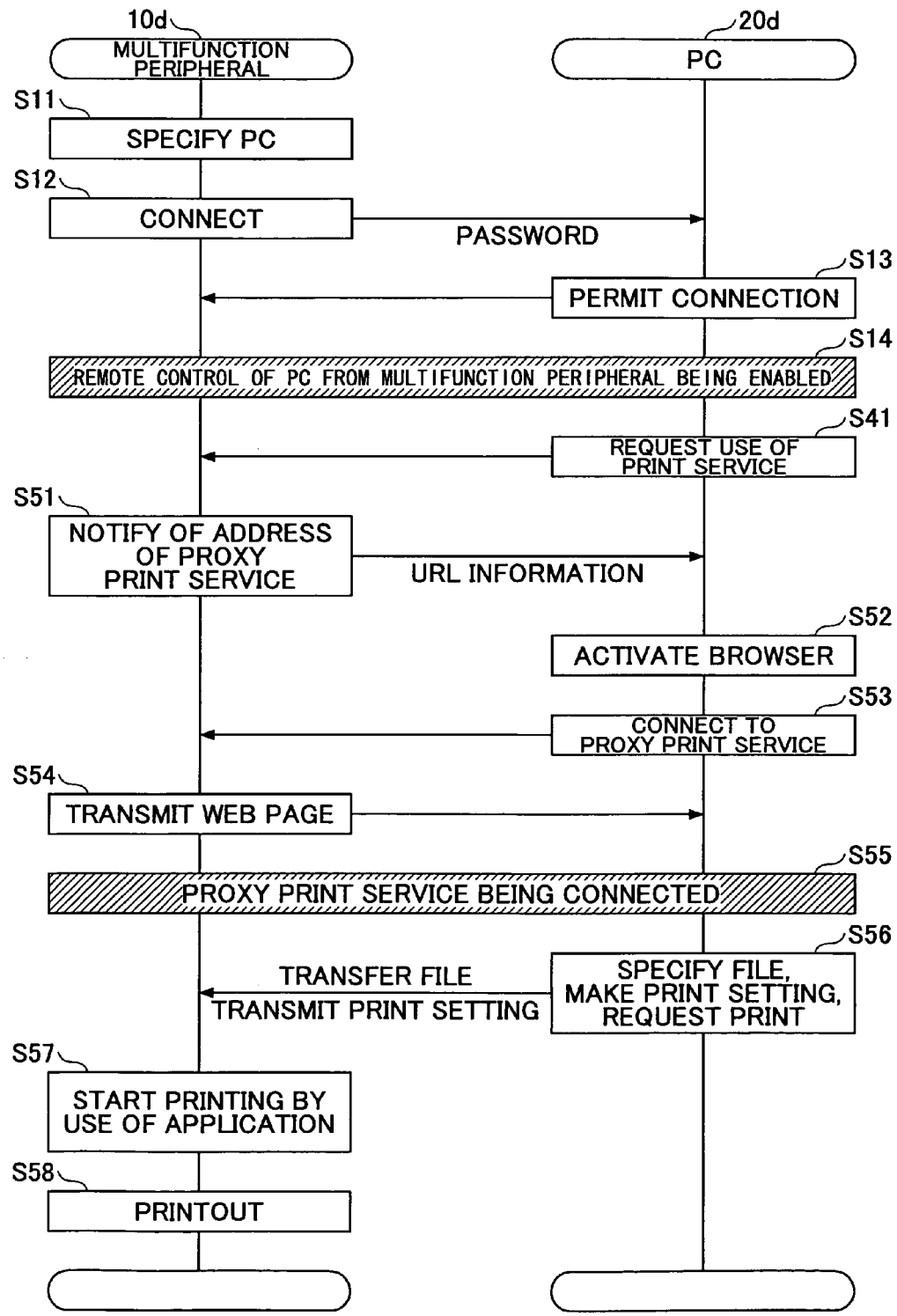
FIG. 13 is a drawing showing an operating procedure of the information processing system according to the fifth embodiment.

FIG. 13 is a drawing showing an operating procedure of the information processing system according to the fifth embodiment. In FIG. 13, the same steps as those of FIG. 11 are referred to by the same numerals, and a description thereof will be omitted as appropriate.

In FIG. 13, the procedure following step S51 differs from that of FIG. 11. When the multifunction peripheral collaboration application 23 sends a request to use a proxy print service to the remote PC collaboration application 13 running on the multifunction peripheral 10d (S41), the remote PC collaboration application 13 returns information inclusive of the URL of a proxy print service provided by the multifunction peripheral 10d as proxy print service usage information (S51).

In response, the multifunction peripheral collaboration application 23 spontaneously activates a Web browser by indicating the URL of the proxy print service provided by the multifunction peripheral 10d. Thereafter, the same procedure as that of the fourth embodiment is performed to produce a printout (S53 through S58), except that the processes performed by the proxy print service personal computer 50 in the fourth embodiment are now performed by the multifunction peripheral 10d.

As described above, according to the information processing system 1d of the fifth embodiment, the proxy print service personal computer 50 is unnecessary since the multifunction peripheral 10d provides a proxy print service. This makes it easier to configure a network, and makes it possible to reduce network traffic.

Figure 14:
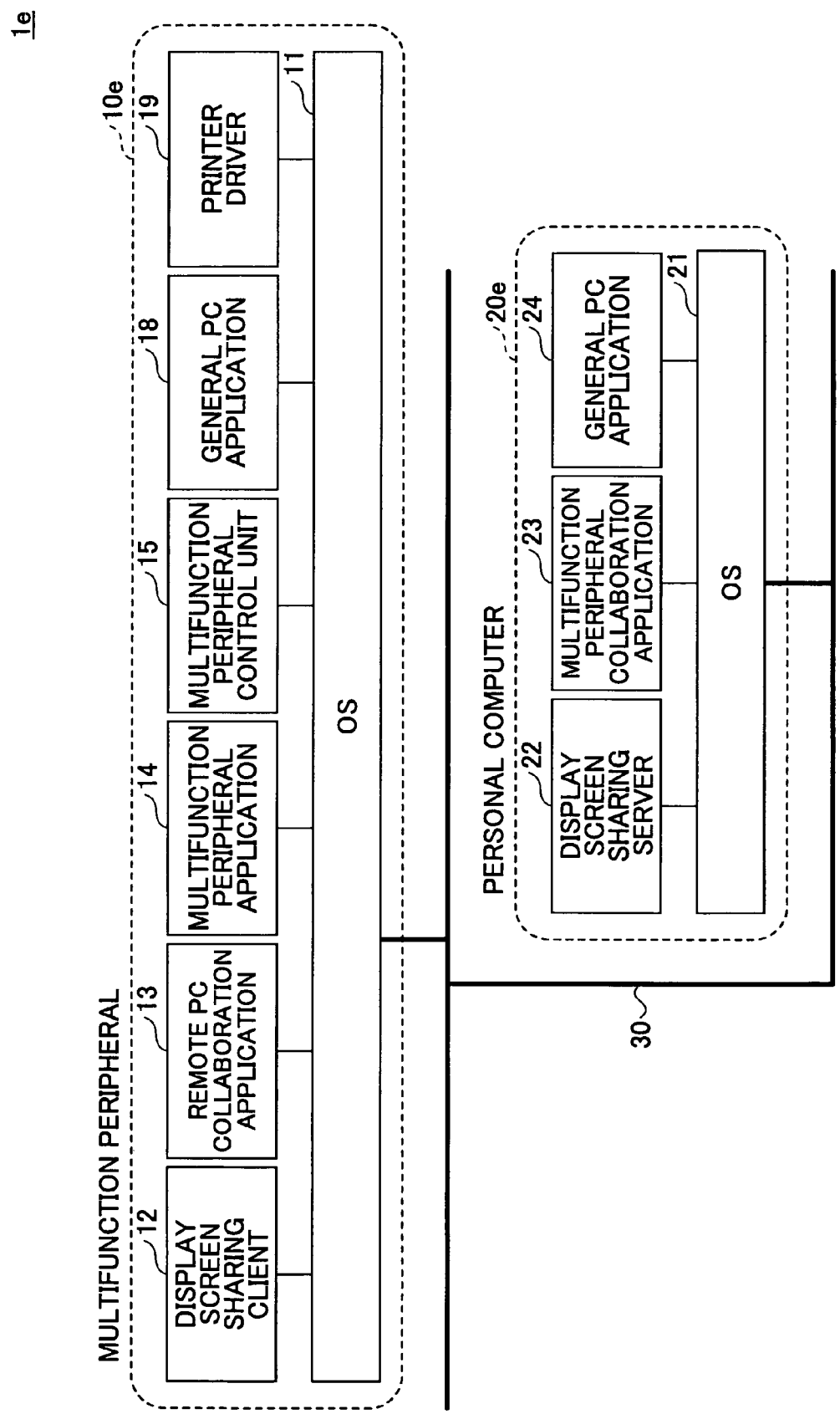
FIG. 14 is a drawing showing an example of the configuration of an information processing system according to a sixth embodiment.

In the following, a sixth embodiment will be described. FIG. 14 is a drawing showing an example of the configuration of an information processing system according to the sixth embodiment. In FIG. 14, the same elements as those of FIG. 12 are referred to by the same numerals, and a description thereof will be omitted.

In the information processing system 1e shown in FIG. 14, the multifunction peripheral 10e has the printer driver 19 and the general PC application 18 installed therein. The printer driver 19 is provided for the purpose of a local printing function, and the general PC application 18 is provided for the purpose of editing various documents. With this provision, it is possible to activate a desired application to edit a document and to print the document locally. Further, provision is made such that files are transferred between the display screen sharing server 22 and the display screen sharing client 12.

Figure 15:
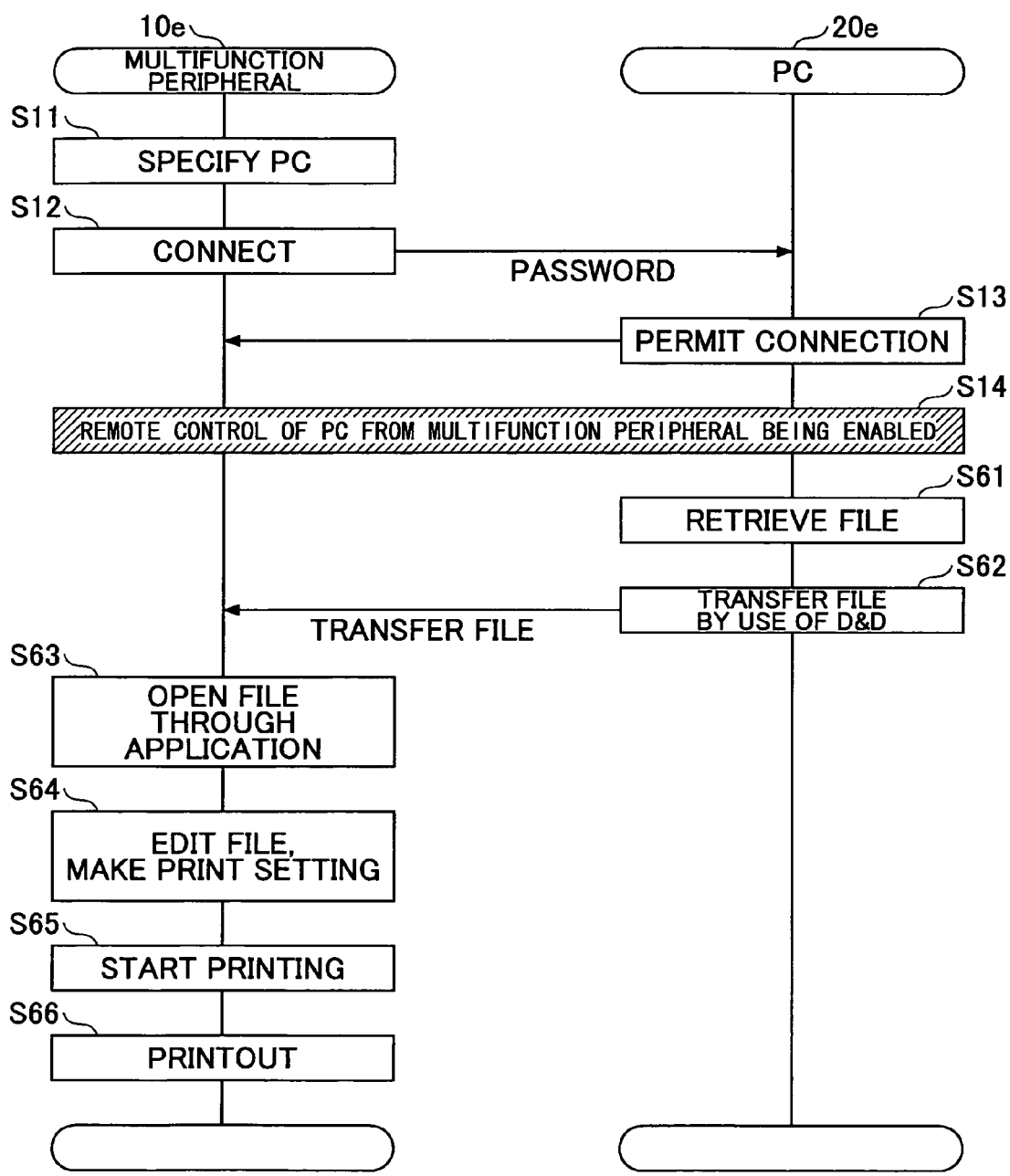
FIG. 15 is a drawing showing an operating procedure of the information processing system according to the sixth embodiment.

FIG. 15 is a drawing showing an operating procedure of the information processing system according to the sixth embodiment. In FIG. 15, the same steps as those of FIG. 13 are referred to by the same numerals, and a description thereof will be omitted as appropriate.

In FIG. 15, the procedure following step S61 is different from that shown in FIG. 13. When the sharing of a display screen is enabled (S14), the user remotely operates the personal computer 20e from the multifunction peripheral 10e to search for a document file to be printed by use of file management software such as Explorer on the personal computer 20e. The user may drag a document icon shown in the shared display screen of the personal computer 20e displayed on the operation panel 111 to move the icon to a desktop display screen of the multifunction peripheral 10e, followed by dropping the icon on the desktop display screen. In response, the document file is transferred from the personal computer 20e to the multifunction peripheral 10e through the display screen sharing server 22 and the display screen sharing client 12 (S62).

Upon the completion of the file transfer, the user uses an application (general PC application 18) installed in the multifunction peripheral 10e to open and edit the file (S63). When a print instruction is issued by use of the application (S64), the printer driver 19 or the like prints the file according to the user's desired settings (S65, S66).

The function to transfer a file from the multifunction peripheral 10e to the personal computer 20e may be implemented, such that the document file edited at the multifunction peripheral 10e is stored as an updated file in the personal computer 20e. Further, provision may be made such that the remote PC collaboration application 13 detects a disconnection of the link with the display screen sharing client 12, and, in response, spontaneously removes the document file that was transferred by drag-&-drop operation. This improves security. Further, provision may be made such that the remote PC collaboration application 13 manages files by using a security-protected folder separately for each user, and stores document files transferred by drag-&-drop operation in these user-specific folders, thereby improving security.

As described above, according to the information processing system 1e of the sixth embodiment, the multifunction peripheral 10e has the function to activate applications in the same manner as in the personal computer 20e. Accordingly, a document file may be transferred to the multifunction peripheral 10e by remotely controlling the personal computer 20e to open the document file by activating the application on the multifunction peripheral 10e, thereby printing the document file according to the user's desired print settings. When the speed of the network link is slow so as to make it cumbersome to perform remote control by use of display screen sharing, the configuration of the present embodiment that allows print operations to be performed at the multifunction peripheral 10e following the transfer of the file makes it possible to perform various operations such as print setting operations with ease.

Figure 16:
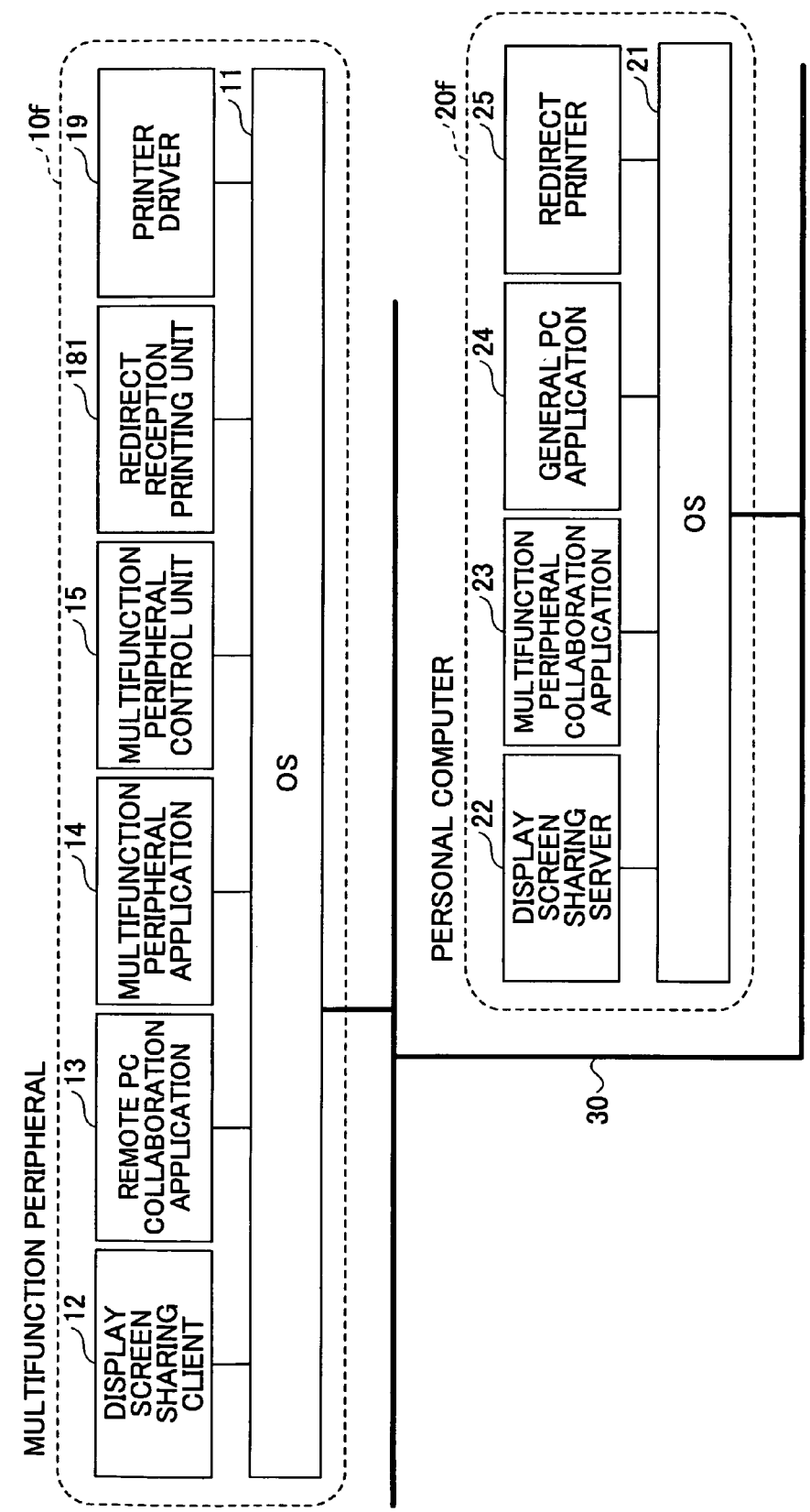
FIG. 16 is a drawing showing an example of the configuration of an information processing system according to a seventh embodiment.

In the following, a seventh embodiment will be described. FIG. 16 is a drawing showing an example of the configuration of an information processing system according to the seventh embodiment. In FIG. 16, the same elements as those of FIG. 14 are referred to by the same numerals, and a description thereof will be omitted.

In an information processing system 1f shown in FIG. 16, a personal computer 20f is provided with a virtual printer driver (redirect printer 25) installed therein. The redirect printer 25 serves to convert a document file into a universally used data format (e.g., a Postscript format or bitmap format)

that can be used as it is by a multifunction peripheral 10f and to transmit the converted file to the multifunction peripheral 10f.

The multifunction peripheral 10f is provided with a redirect reception printing unit 181, which receives a file from the redirect printer 25 and prints the received data to the printer of the multifunction peripheral 10f. Since files provided in the bitmap format or Postscript format are printable through various types of printers, the provision of the redirect printer 25 makes it possible to perform printing regardless of the printer model. The functions provided by the redirect printer 25 and the redirect reception printing unit 181 are hereinafter referred to as "redirect functions".

As a virtual printer driver that converts a document file into Postscript-format data, Adobe PDFWriter may be known. As a virtual printer driver that converts a document file into an image file in the bitmap format, Print to Image offered by Ricoh System Development may be known.

Figure 17:
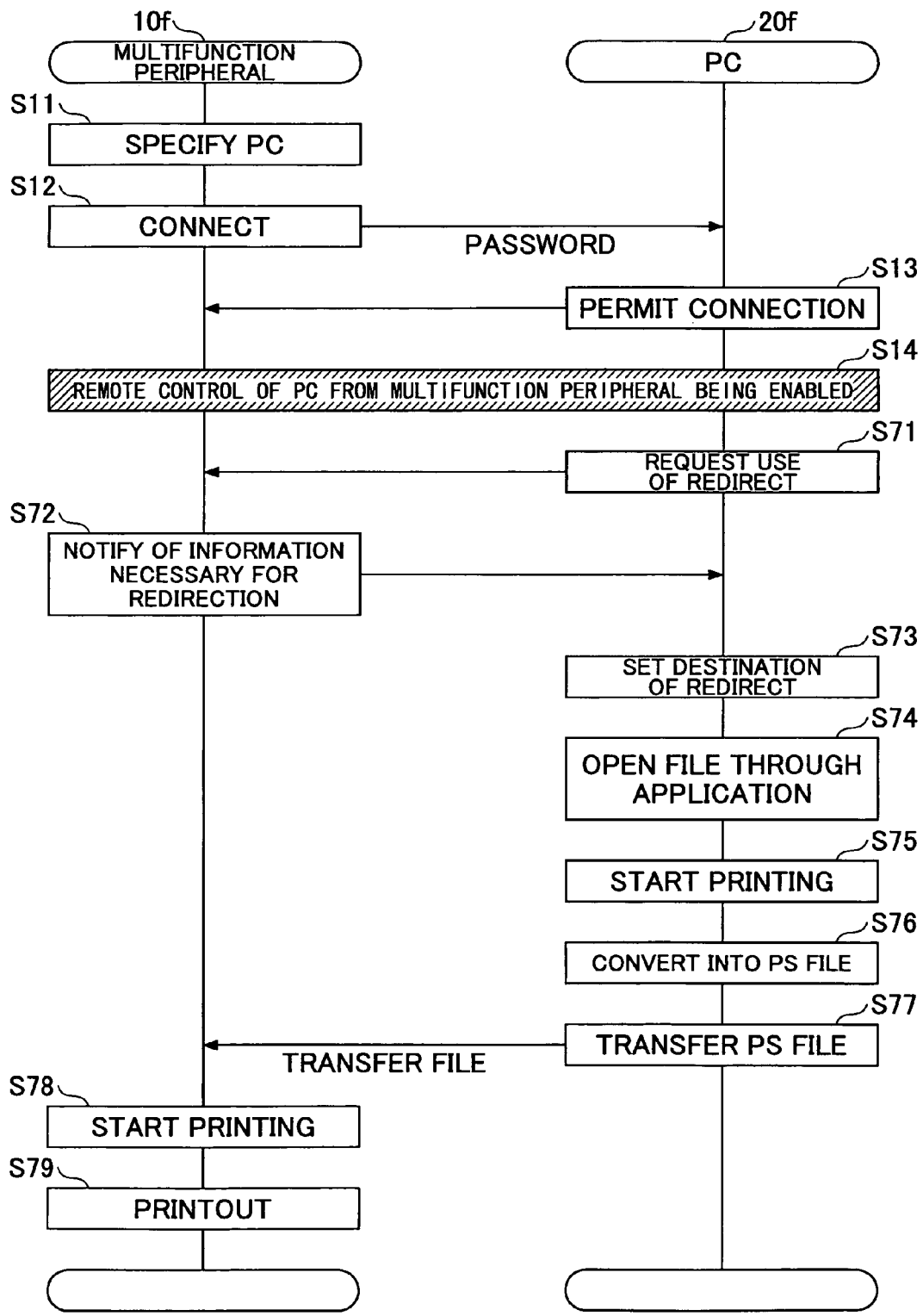
FIG. 17 is a drawing showing an operating procedure of the information processing system according to the seventh embodiment.

FIG. 17 is a drawing showing an operating procedure of the information processing system according to the seventh embodiment. In FIG. 17, the same steps as those of FIG. 15 are referred to by the same numerals, and a description thereof will be omitted as appropriate.

In FIG. 17, the procedure following step S71 is different from that shown in FIG. 15. When the sharing of a display screen is enabled (S14), the user remotely operates the personal computer 20f from the multifunction peripheral 10f to display the display screen of the multifunction peripheral collaboration application 23 and then to give the multifunction peripheral collaboration application 23 an instruction to use the redirect function. In response to the user instruction, the multifunction peripheral collaboration application 23 requests the remote PC collaboration application 13 running on the multifunction peripheral 10f to use the redirect function (S71).

The remote PC collaboration application 13 returns the information necessary to print to the local printer through the redirect function (hereinafter referred to as "redirect usage information") (S72). The redirect usage information includes the name and/or IP address of the multifunction peripheral 10f, the file format supported by the multifunction peripheral 10f, etc.

Upon receiving the redirect usage information, the multifunction peripheral collaboration application 23 spontaneously makes settings to the redirect printer 25 based on the redirect usage information (S73). In this example, it is assumed that information indicating that the Postscript format is printable is provided as the redirect information.

The user remotely operates the personal computer 20f through the multifunction peripheral 10f to open a document file by use of an application (S74) and to provide a print instruction (S75). In so doing, the redirect printer 25 is selected that redirects the file to the currently operated multifunction peripheral 10f as a printer to be used, and the Postscript format is selected as a file format.

In response to the print instruction, the redirect printer 25 converts the document file into a Postscript file (S76), and transmits the Postscript file together with information indicative of the print settings (the number of print copies and so on) to the multifunction peripheral 10f (S77). The redirect reception printing unit 181 of the multifunction peripheral 10f controls the printing of the Postscript file based on the received print settings (S78, S79).

In the above example, the user remotely controls the personal computer 20f from the multifunction peripheral 10f to manually request the use of the redirect function (S71). Alternatively, the multifunction peripheral collaboration application 23 may spontaneously perform the redirect printer 25 in response to the establishment of display screen sharing.

As described above, according to the information processing system if of the seventh embodiment, a document file to be printed is converted at the personal computer 20f into a file format that is generally printable by any types of printers, followed by being transmitted to the multifunction peripheral 10f. This eliminates the need to install a printer-specific driver in the personal computer 20f separately for each of the different models of multifunction peripherals 10f.

Figure 18:
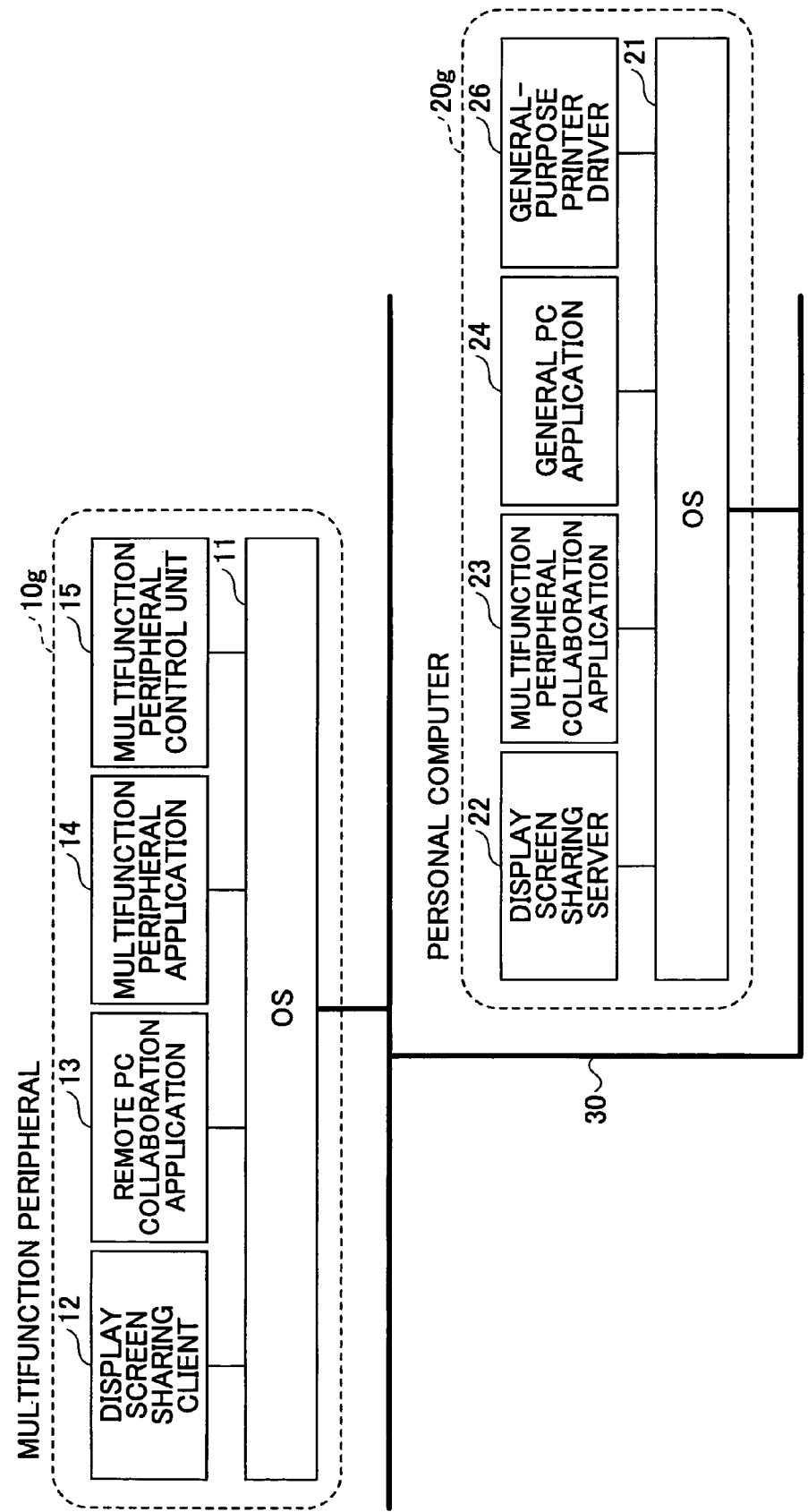
FIG. 18 is a drawing showing an example of the configuration of an information processing system according to an eighth embodiment.

In the following, an eighth embodiment will be described. FIG. 18 is a drawing showing an example of the configuration of an information processing system according to the eighth embodiment. In FIG. 18, the same elements as those of FIG. 16 are referred to by the same numerals, and a description thereof will be omitted.

In an information processing system 1g shown in FIG. 18, a personal computer 20g has a general-purpose printer driver 26 installed therein. The general-purpose printer driver 26 serves to convert a document file into print data having a data format defined according to BMLinks (e.g., the TIFF format). Accordingly, the personal computer 20g can use the general-purpose printer driver 26 to print to any printer complying with BMLinks, without the need to install a printer-specific printer driver.

BMLinks is an integrated interface specification regarding OA systems that is established by the OA systems project committee. Further details are available at http://www.jbmia.or.jp/bmlinks/.

In this example, the multifunction peripheral 10g is supposed to comply with BMLinks.

Figure 19:
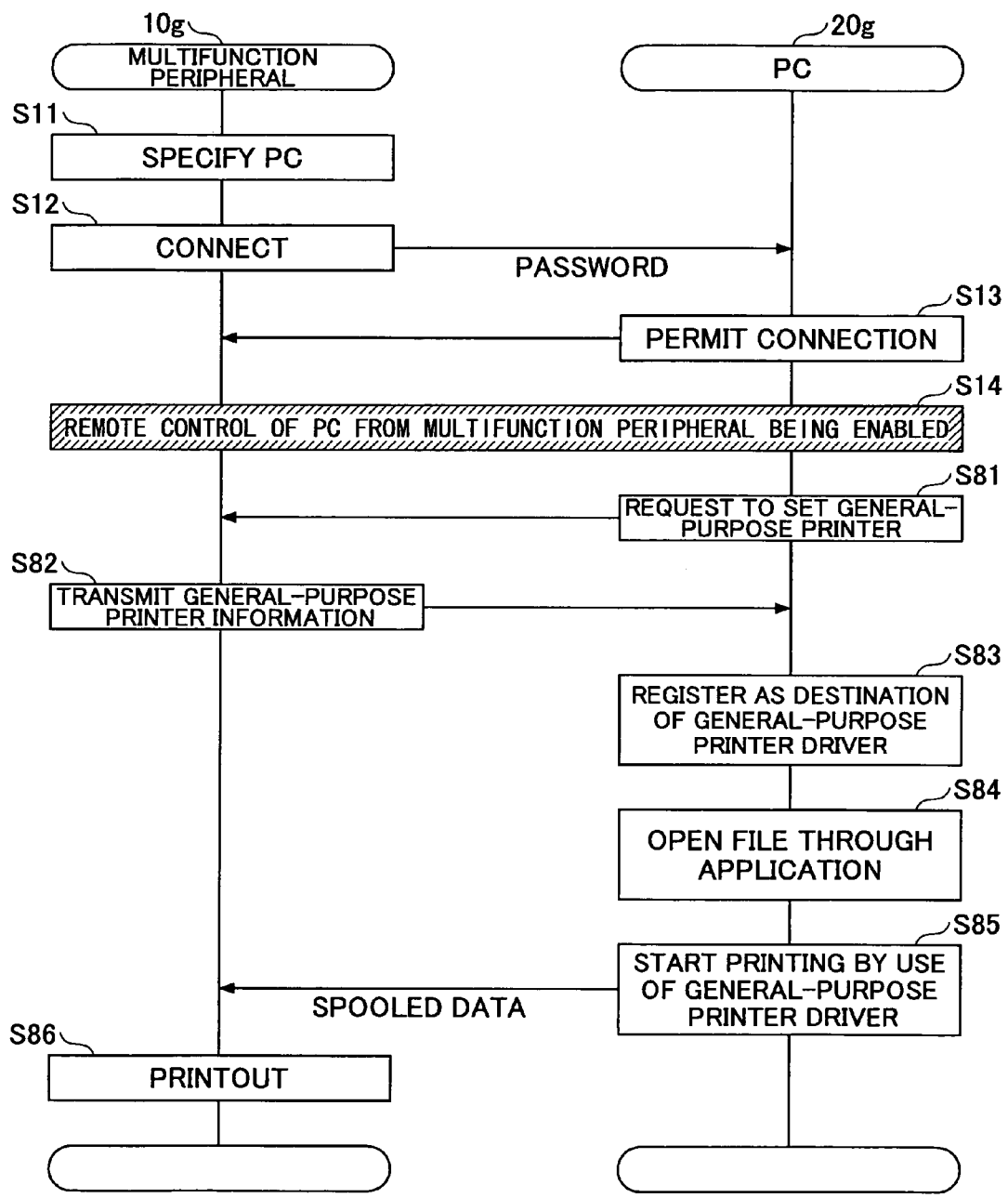
FIG. 19 is a drawing showing an operating procedure of the information processing system according to the eighth embodiment.

FIG. 19 is a drawing showing an operating procedure of the information processing system according to the eighth embodiment. In FIG. 19, the same steps as those of FIG. 17 are referred to by the same numerals, and a description thereof will be omitted as appropriate.

In FIG. 19, the procedure following step S81 is different from that shown in FIG. 17. When the sharing of a display screen is enabled (S14), the user remotely operates the personal computer 20g from the multifunction peripheral 10g to display the display screen of the multifunction peripheral collaboration application 23 and then to give the multifunction peripheral collaboration application 23 an instruction to set the general-purpose printer driver 26. In response to the user instruction, the multifunction peripheral collaboration application 23 requests the remote PC collaboration application 13 running on the multifunction peripheral 10g to set the general-purpose printer (S81).

The remote PC collaboration application 13 returns the information necessary to specify the local printer as a printout destination (hereinafter referred to as "general-purpose printer information") (S82). The general-purpose printer information includes the name, IP address, and information regarding printer performance of the multifunction peripheral 10g, for example.

Upon receiving the general-purpose printer information, the multifunction peripheral collaboration application 23 spontaneously registers the information indicative of the multifunction peripheral 10g as a printout destination of the general-purpose printer driver 26 based on the general-purpose printer information, and makes a setting such as to display it as a default printer when the user is to perform printing (S83).

The user remotely operates the personal computer 20g through the multifunction peripheral 10g to open a document file by use of an application (S84) and to provide a print instruction (S75). In so doing, the general-purpose printer driver 26 is selected as the printer to be used, resulting in the multifunction peripheral 10g being selected as the default printout destination. When printing is started after specifying the number of printed copies and the like, the print data spooled by the general-purpose printer driver 26 is transmitted to the multifunction peripheral 10g (S85), and is then printed by the printer of the multifunction peripheral 10g (S86).

In the above example, the user remotely controls the personal computer from the multifunction peripheral 10g to manually request the setting of the general-purpose printer through the multifunction peripheral collaboration application 23 (S81). Alternatively, the multifunction peripheral collaboration application 23 may spontaneously set the printout destination of the general-purpose printer in response to the establishment of display screen sharing.

As described above, according to the information processing system 1g of the eighth embodiment, the use of the general-purpose printer driver 26 makes it possible to print from the personal computer 20g through remote control without the need to install a printer-specific printer driver in the personal computer 20g. Compared to the information processing system 1f of the seventh embodiment, relatively detailed or extensive print settings can be made, and relatively small network traffic suffices to provide highly defined printouts.

Figure 20:
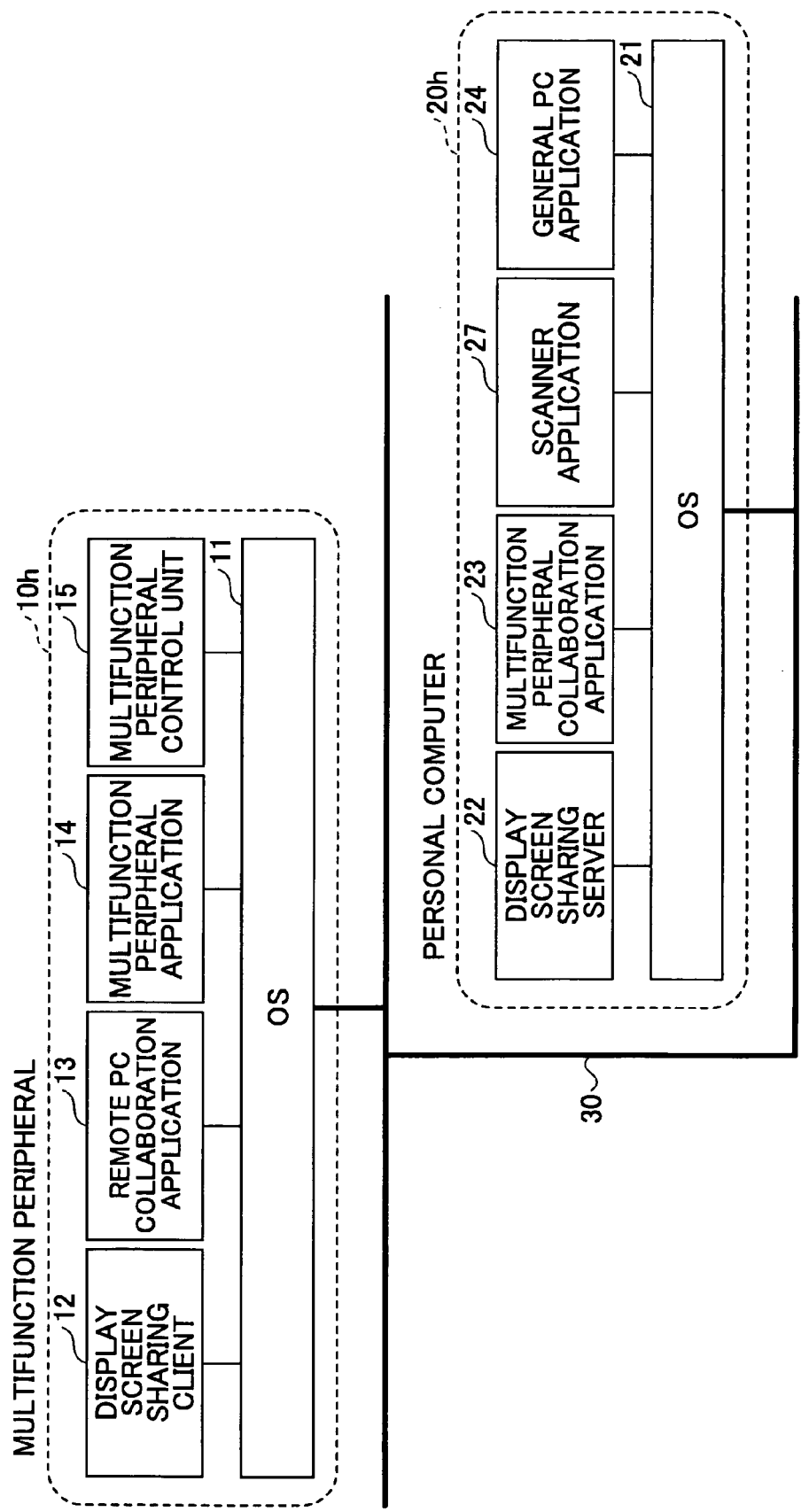
FIG. 20 is a drawing showing an example of the configuration of an information processing system according to a ninth embodiment.

In the following, a ninth embodiment will be described. FIG. 20 is a drawing showing an example of the configuration of an information processing system according to the ninth embodiment. In FIG. 20, the same elements as those of FIG. 18 are referred to by the same numerals, and a description thereof will be omitted.

In an information processing system 1h shown in FIG. 20, a personal computer 20h has application software (scanner application 27) installed therein. The scanner application 27 serves to control a scanner that is registered as a scanner device on the operating system 21, thereby causing the scanner to scan an image. As the scanner application 27, Imaging for Windows (registered trademark) or the like provided from Kodak may be used.

Figure 21:
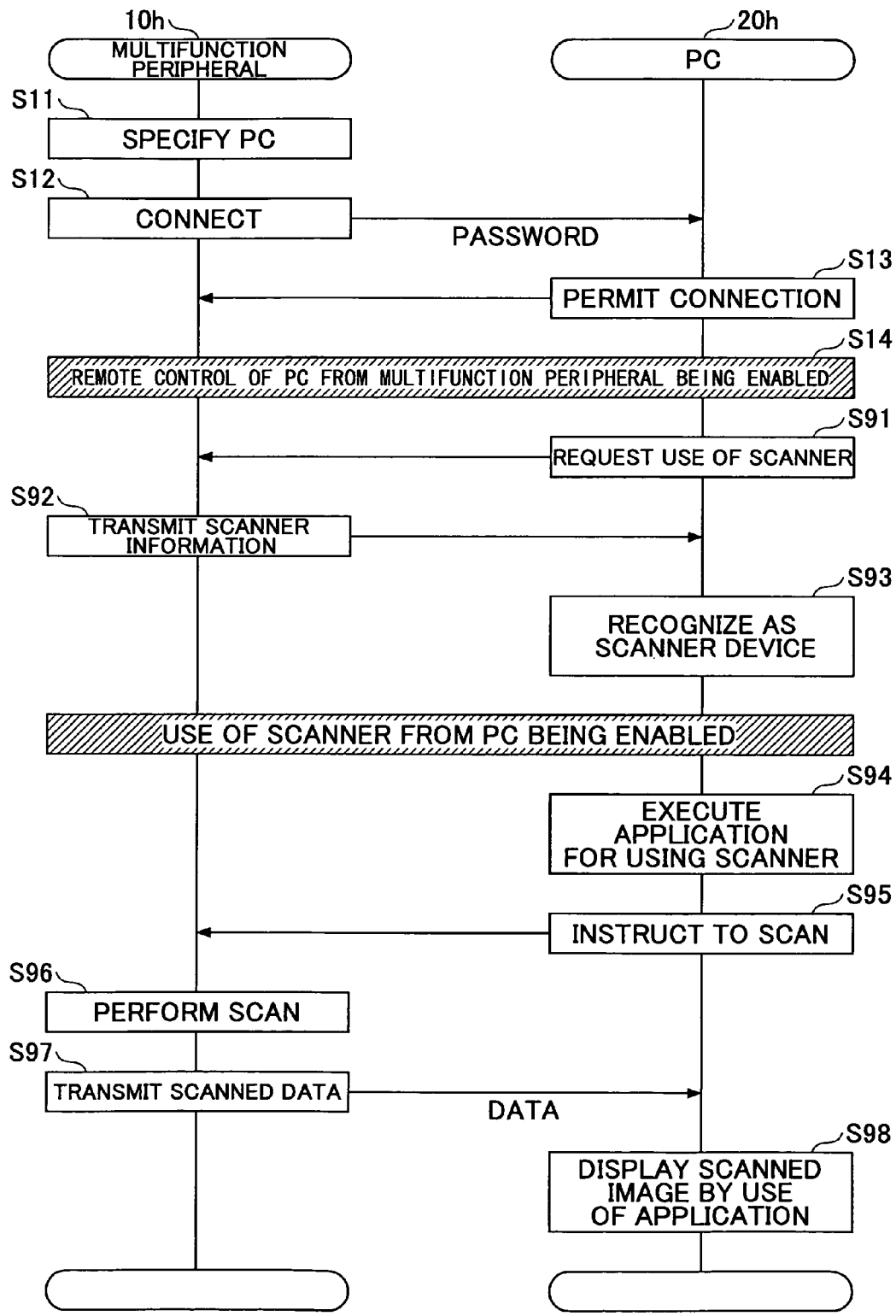
FIG. 21 is a drawing showing an operating procedure of the information processing system according to the ninth embodiment.

FIG. 21 is a drawing showing an operating procedure of the information processing system according to the ninth embodiment. In FIG. 21, the same steps as those of FIG. 19 are referred to by the same numerals, and a description thereof will be omitted as appropriate.

In FIG. 21, the procedure following step S91 is different from that shown in FIG. 19. When the sharing of a display screen is enabled (S14), the user remotely operates the personal computer 20h from the multifunction peripheral 10h to display the display screen of the multifunction peripheral collaboration application 23 and then to give the multifunction peripheral collaboration application 23 an instruction to use a scanner. In response to the user instruction, the multifunction peripheral collaboration application 23 requests the remote PC collaboration application 13 running on the multifunction peripheral 10h to use the scanner (S91).

The remote PC collaboration application 13 returns the information necessary for the operating system 21 of the personal computer 20h to use the multifunction peripheral 10h as a scanner device (hereinafter referred to as "scanner information") (S92). The scanner information includes the name, IP address, and the like of the multifunction peripheral 10h, for example.

Upon receiving the scanner information, the multifunction peripheral collaboration application 23 causes the operating system 21 to identify the scanner of the multifunction peripheral 10h based on the scanner information (S93).

The user remotely operates the scanner application 27 of the personal computer 20h from the multifunction peripheral 10h to display the display screen of the scanner application (hereinafter referred to as "scanner setting screen") (S94). The user specifies necessary items on the scanner setting screen, and then instructs to start the scan. In response, the scanner application 27 transmits a scan instruction to the multifunction peripheral 10h (S95).

In response to the scan instruction, the multifunction peripheral 10h scans the document placed on the scanner unit (S96), and transmits the data of the scanned image to the personal computer 20h (S97). Thereafter, the user can edit or perform other operations on the image data transferred to the personal computer 20h by use of an application through remote control from the multifunction peripheral 10h (S98).

In the above example, the user remotely controls the personal computer 20h from the multifunction peripheral 10h to manually request the use of a scanner (S91). Alternatively, the multifunction peripheral collaboration application 23 may spontaneously cause the scanner to be identified in response to the establishment of display screen sharing.

As described above, according to the information processing system 1h of the ninth embodiment, the user can perform scan by remotely controlling his/her personal computer 20h from the operation panel 111 of the multifunction peripheral 10h. Without going through the trouble of returning to his/her own desk, therefore, the user can perform scan, check the scanned contents, perform edit operations such as pasting the scanned image to a document file stored in the personal computer 20h on the spot, and transmit the scanned image by pasting it to mail by use of the mailer of the personal computer 20h. In so doing, the user can use the scanner application 27 of the personal computer 20h that the user is accustomed to use, rather than using an application running on the multifunction peripheral 10h. This allows work to be performed with ease.

Further, the ninth embodiment may be combined with any one of the first through eighth embodiments, which allows a scanned image to be printed to the multifunction peripheral 10h after the scanned image is edited or pasted to another document through remote operation. Not only the user can work on the personal computer 20h that the user is accustomed to use, but also the user can complete his/her work in a short time without going back and forth between the multifunction peripheral 10h and the personal computer 20h.

In the following, a tenth embodiment will be described. The system configuration of the tenth embodiment is the same as that shown in FIG. 7. It should be noted, however, that the printer sharing service personal computer 40 is not an absolute requirement.

Figure 22:
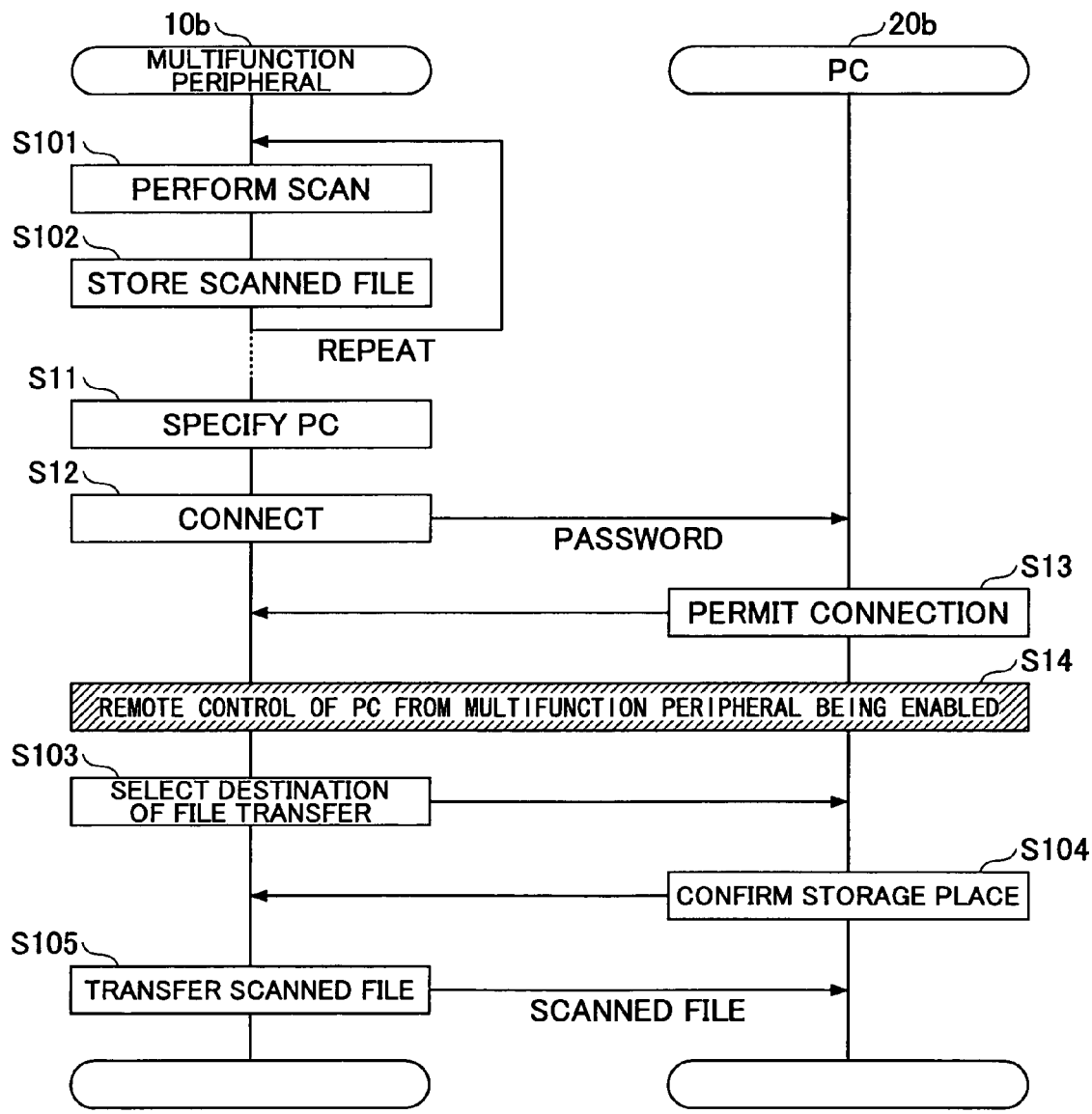
FIG. 22 is a drawing showing a first operating procedure of the information processing system according to a tenth embodiment.

FIG. 22 is a drawing showing a first operating procedure of the information processing system according to the tenth embodiment. In FIG. 22, the same steps as those of FIG. 21 are referred to by the same numerals, and a description thereof will be omitted as appropriate.

The user uses the multifunction peripheral application 14 to request the scanning of a document from the operation panel 111 (S101). In response, the multifunction peripheral application 14 performs a scan, and stores the scanned image in the storage device (HDD 116) of the multifunction peripheral 10b as an image file or a Postscript file (S102). In this example, there may be two or more document sheets, and the scanned images are stored as an image file in the HDD 116.

After the completion of the scan, the user activates the display screen sharing client 12 from the operation panel 111, thereby making it possible to remotely operate his/her personal computer 20b (S11 through S14).

Upon the detection of the presence of the scanned images, the remote PC collaboration application 13 running on the multifunction peripheral 10b starts communicating with the multifunction peripheral collaboration application 23 running on the personal computer 20b, and causes a display screen (hereinafter referred to as a "folder selection screen") to be displayed on the operation panel 111. The folder selection screen asks which folder of the personal computer 20b is the folder to which the scanned images are to be transferred.

The user selects the destination folder on the folder selection screen (S103). The selection is reported to the personal computer 20b, which then fixes the destination (S104). Thereafter, the image file containing the scanned images is transferred from the multifunction peripheral 10b to the selected folder of the personal computer 20b (S105).

Figure 23:
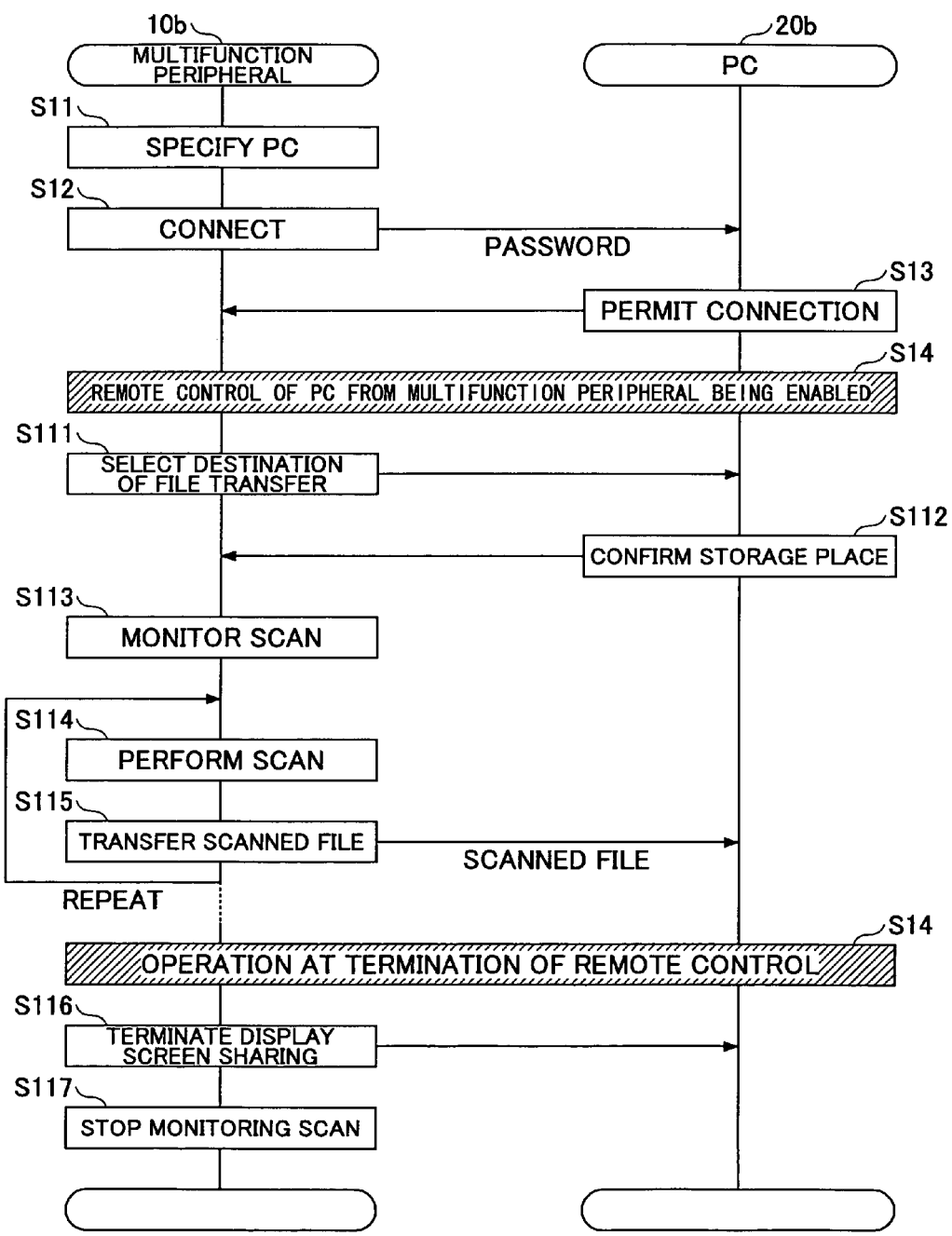
FIG. 23 is a drawing showing a second operating procedure of the information processing system according to the tenth embodiment.

FIG. 23 is a drawing showing a second operating procedure of the information processing system according to the tenth embodiment.

The user activates the display screen sharing client 12 from the operation panel 111 to enable the remote controlling of his/her personal computer 20b (S11 through S14).

In response to the sharing of the display screen, the remote PC collaboration application 13 running on the multifunction peripheral 10b starts communicating with the multifunction peripheral collaboration application 23 running on the personal computer 20b, and causes the folder selection screen to be displayed on the operation panel 111.

The user selects the destination folder on the folder selection screen (S111). The selection is reported to the personal computer 20b, which then fixes the destination (S112). The remote PC collaboration application 13 then monitors an image scan (S113).

The user uses the multifunction peripheral application 14 to scan an image (S114). The remote PC collaboration application 13 detects the scan, and spontaneously transfers a file containing the scanned images to the selected folder of the personal computer 20b (S115).

Thereafter, the display screen sharing client 12 is disabled (S116). In response, the remote PC collaboration application 13 stops monitoring a scan (S117).

As described above, according to the information processing system 1b of the tenth embodiment, an image scanned by the multifunction peripheral 10b can be transferred to the remotely controlled personal computer 20b without the need to specify a user-specific destination folder in advance. This saves the user from the trouble of making necessary settings. Further, the scanned images are successively transferred to the remotely controlled personal computer 20b, which eliminates the trouble relating to the transfer.

In the following, an eleventh embodiment will be described. The system configuration of the eleventh embodiment is the same as that shown in FIG. 7. It should be noted, however, that the printer sharing service personal computer 40 is not an absolute requirement.

Figure 24:
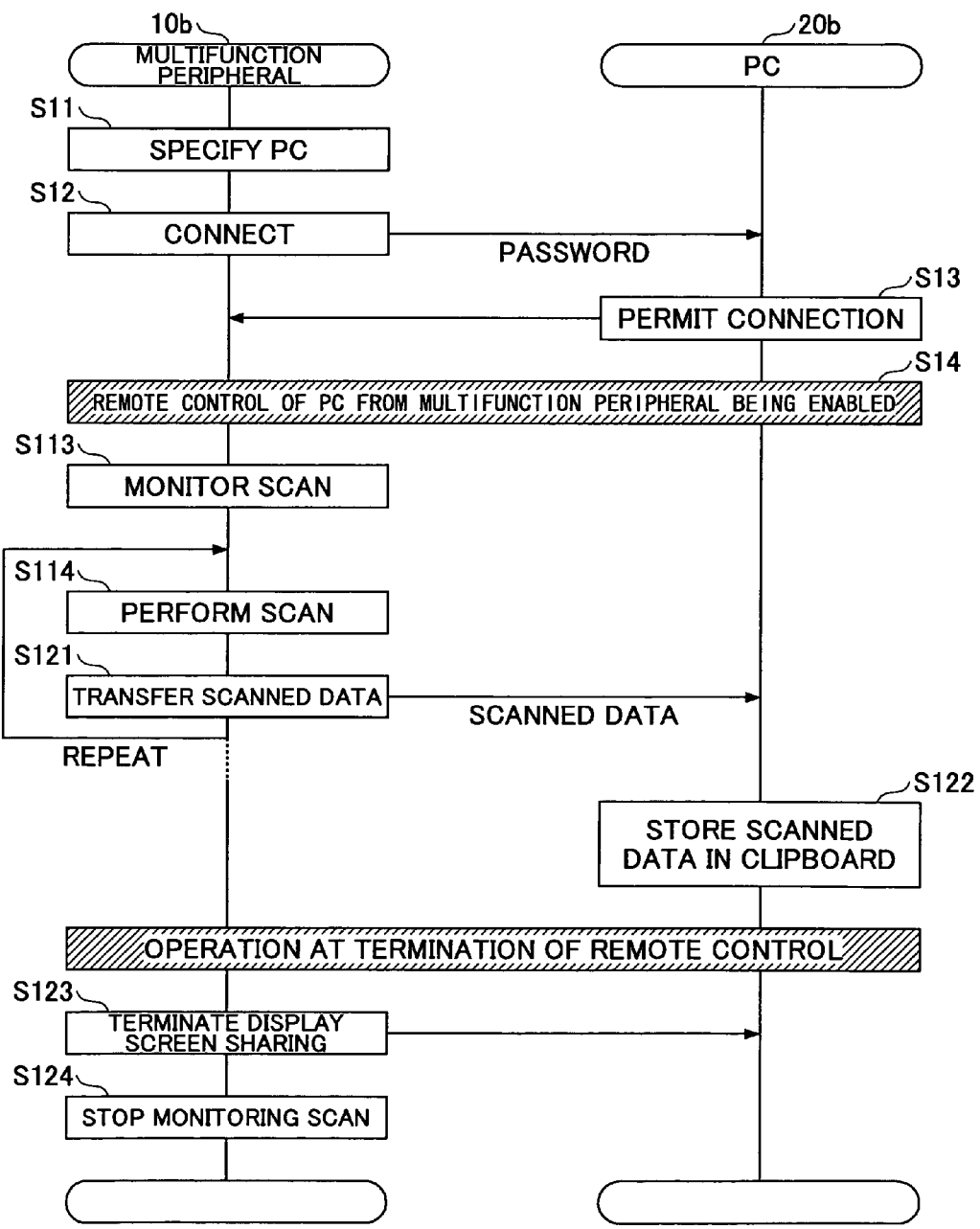
FIG. 24 is a drawing showing an operating procedure of the information processing system according to an eleventh embodiment.

FIG. 24 is a drawing showing an operating procedure of the information processing system according to the eleventh embodiment. In FIG. 24, the same steps as those of FIG. 23 are referred to by the same numerals, and a description thereof will be omitted as appropriate.

The user activates the display screen sharing client 12 from the operation panel 111 to enable the remote controlling of his/her personal computer 20b (S11 through S14). In response, the remote PC collaboration application 13 monitors an image scan (S113).

The user uses the multifunction peripheral application 14 to scan an image (S114). The remote PC collaboration application 13 detects the scan, and spontaneously transfers a file containing the scanned images to the multifunction peripheral collaboration application 23 of the personal computer 20b (S121). Having received the image data, the multifunction peripheral collaboration application 23 stores the image data in the clipboard of the personal computer 20b (S122).

With this provision, the user can remotely operate the personal computer 20b from the multifunction peripheral 10b to create and edit a document by use of a desired application on his/her own personal computer 20b and to paste the image data stored in the clipboard to the document with ease.

Thereafter, the display screen sharing client 12 is disabled (S123). In response, the remote PC collaboration application 13 stops monitoring a scan (S124).

As described above, according to the information processing system 1b of the eleventh embodiment, image data scanned by the multifunction peripheral 10b is transferred to the clipboard of the remotely controlled personal computer 20b. This makes it possible for the user to paste the scanned images readily to the document that is opened on the personal computer 20b. The time and work steps required for document editing can thus be reduced.

Figure 25:
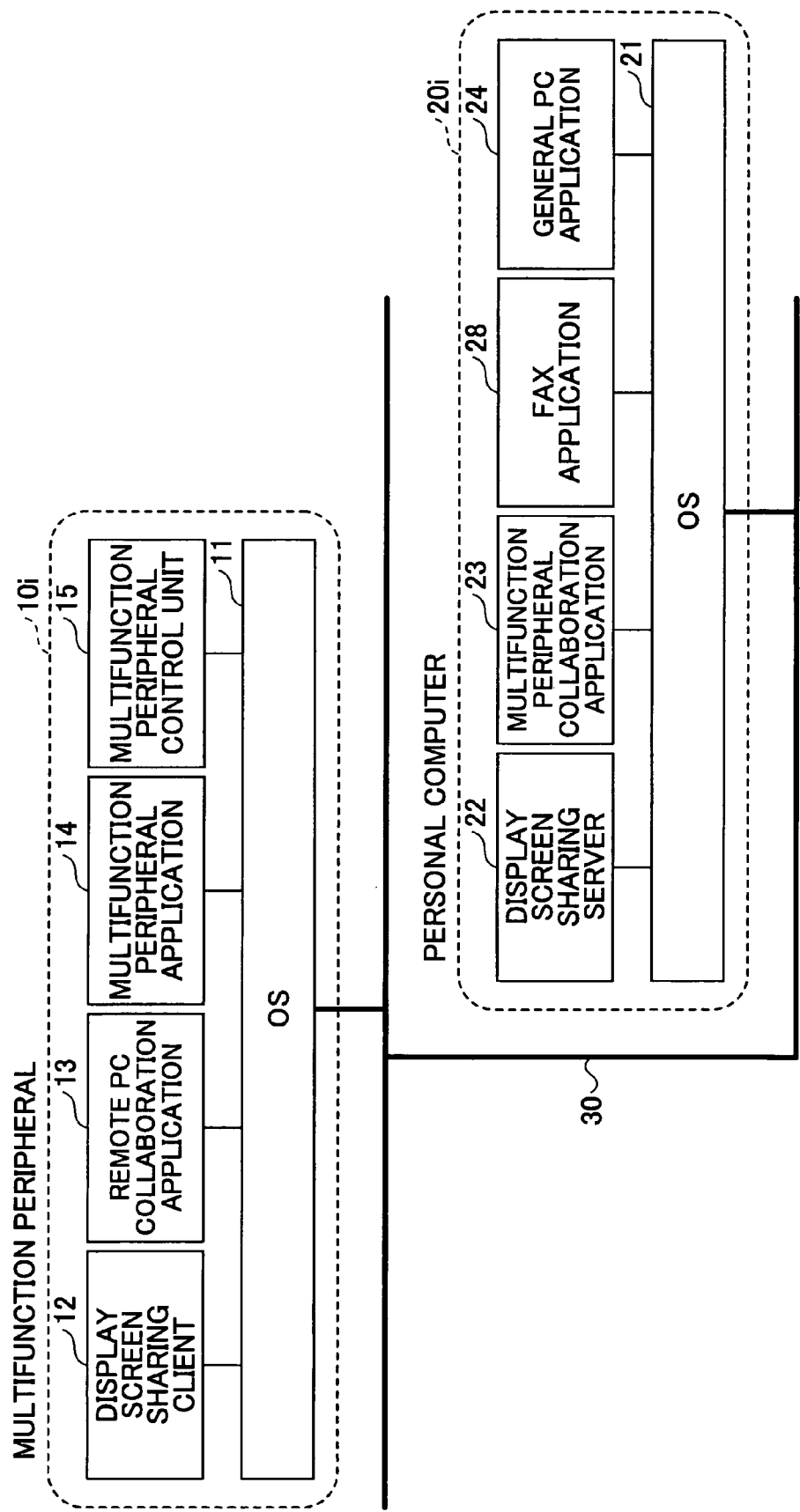
FIG. 25 is a drawing showing an example of the configuration of an information processing system according to a twelfth embodiment.

In the following, a twelfth embodiment will be described. FIG. 25 is a drawing showing an example of the configuration of an information processing system according to the twelfth embodiment. In FIG. 25, the same elements as those of FIG. 20 are referred to by the same numerals, and a description thereof will be omitted.

In an information processing system 1i shown in FIG. 25, a personal computer 20i has application software (FAX application 28) installed therein. The FAX application 28 serves to control the FAX registered as a FAX device on the operating system 21 thereby to perform FAX transmission/reception. Microsoft Word can perform FAX transmission, for example.

Figure 26:
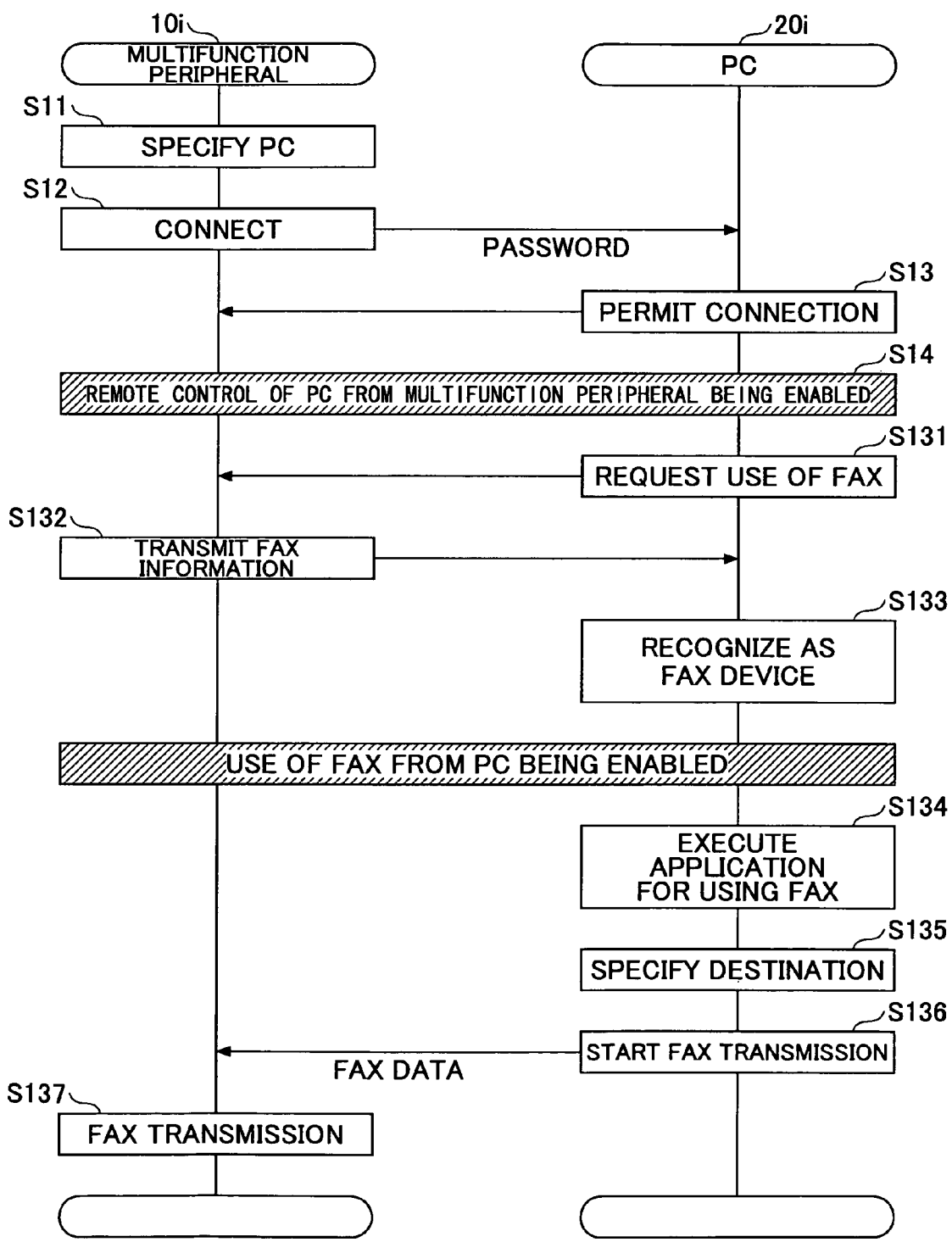
FIG. 26 is a drawing showing an operating procedure of the information processing system according to the twelfth embodiment.

FIG. 26 is a drawing showing an operating procedure of the information processing system according to the twelfth embodiment. In FIG. 26, the same steps as those of FIG. 21 are referred to by the same numerals, and a description thereof will be omitted as appropriate.

In FIG. 26, the procedure following step S131 is different from that shown in FIG. 21. When the sharing of a display screen is enabled (S14), the user remotely operates the personal computer 20i from the multifunction peripheral 10i to display the display screen of the multifunction peripheral collaboration application 23 and then to give the multifunction peripheral collaboration application 23 an instruction to use a FAX. In response to the user instruction, the multifunction peripheral collaboration application 23 requests the remote PC collaboration application 13 running on the multifunction peripheral 10i to use the FAX (S131).

The remote PC collaboration application 13 returns the information necessary for the operating system 21 of the personal computer 20i to use the multifunction peripheral 10i as a FAX device (hereinafter referred to as "FAX information") (S132). The FAX information includes the name, IP address, and the like of the multifunction peripheral 10i, for example.

Upon receiving the FAX information, the multifunction peripheral collaboration application 23 running on the personal computer 20i causes the operating system 21 to identify the FAX (FAX device) of the multifunction peripheral 10i based on the FAX information (S133).

The user remotely operates the FAX application 28 of the personal computer 20i from the multifunction peripheral 10i to display the display screen of the FAX application 28 (hereinafter referred to as "FAX setting screen") (S134). The user selects a document file stored in the personal computer 20i that is to be subjected to FAX transmission, and also specifies a destination, followed by instructing to start FAX transmission (S135). In response, the FAX application 28 transmits a FAX transmission request to the multifunction peripheral 10*i* (S136). Here, the destination may be selected from an address book if such an address book is provided in the personal computer 20*i*.

In response to the FAX transmission request, the multifunction peripheral 10*i* performs FAX transmission (S137).

As described above, according to the information processing system 1*i* of the twelfth embodiment, an application operable to control the FAX transmission/reception performed on the personal computer 20*i* is used to perform the FAX transmission of a desired document stored in the personal computer 20*i* through remote control from the multifunction peripheral 10*i*. Further, since the destination can be selected by use of the address book provided in the personal computer 20*i*, there is no need to specify the destination in advance at the multifunction peripheral 10*i* or to enter the destination at the time of FAX transmission.

Figure 27:
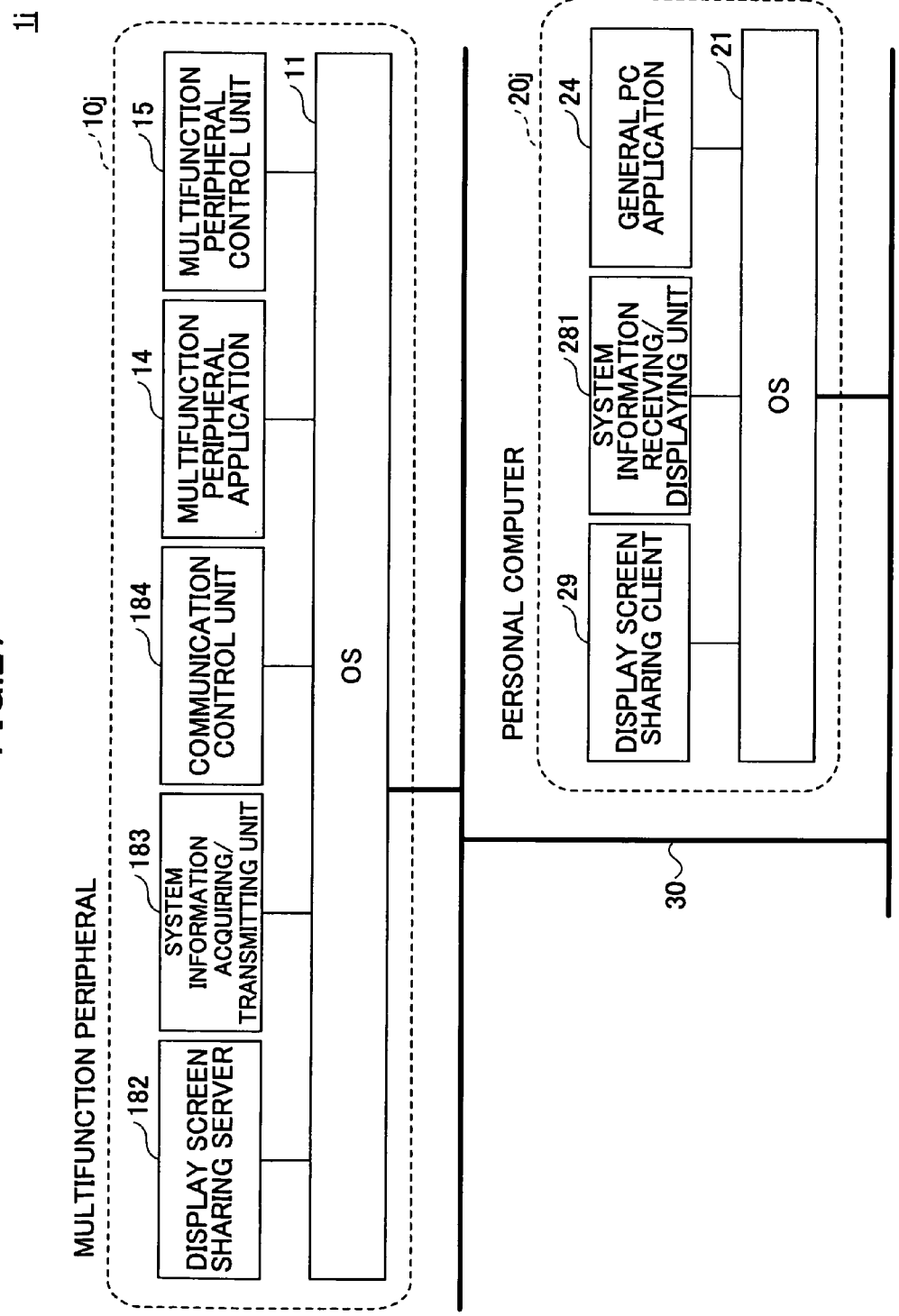
FIG. 27 is a drawing showing an example of the configuration of an information processing system according to a thirteenth embodiment.

In the following, a thirteenth embodiment will be described. FIG. 27 is a drawing showing an example of the configuration of an information processing system according to the thirteenth embodiment. In FIG. 27, the same elements as those of FIG. 25 are referred to by the same numerals, and a description thereof will be omitted.

In an information processing system lj shown in FIG. 27, a personal computer 20*j* has a display screen sharing client 29 and a system information receiving/displaying unit 281 implemented therein. Further, a multifunction peripheral 10*j* has a display screen sharing server 182, a system information acquiring/transmitting unit 183, and a communication control unit 184 implemented therein.

The thirteenth embodiment differs from the previous embodiments in that the multifunction peripheral 10*j* serves as a display screen sharing server (display screen sharing server 182), and the personal computer 20*j* serves as a display screen sharing client (display screen sharing client 29). That is, the display screen of the operation panel 111 of the multifunction peripheral 10*j* is shared at the personal computer 20*j*.

The system information acquiring/transmitting unit 183 of the multifunction peripheral 10*j* serves to acquire internal state values (hereinafter referred to as "multifunction peripheral internal information") of each unit such as the scanner unit and the printer unit for transmission through the network 30.

The system information receiving/displaying unit 281 of the personal computer 20*j* is an application for the remote diagnosis of the multifunction peripheral 10*j*, and receives the multifunction peripheral internal information from the system information acquiring/transmitting unit 183 of the multifunction peripheral 10*j* to display the received information. The system information receiving/displaying unit 281 has the function to establish a connection with the same IP address as the one to which the display screen sharing client 29 is connected. Accordingly, if the display screen sharing client 29 is connected to the multifunction peripheral 10*j*, the system information receiving/displaying unit 281 is also connected to the multifunction peripheral 10*j*.

The communication between the personal computer 20*j* and the multifunction peripheral 10*j* is performed by use of TCP/IP, for example. In this case, the applications for providing the display screen sharing function and remote-diagnosis function establish a common socket connection to conduct communication.

The sharing of a display screen allows the multifunction peripheral 10*j* to be remotely controlled from the personal computer 20*j*, thereby making it possible to check the internal system state values of the multifunction peripheral 10*j* in real time by checking the display screen of the operation panel 111. It is thus possible to perform the diagnosis and maintenance of a multifunction peripheral 10*j* installed at a client site properly from a remote site. Further, working from a remote site can reduce the labor cost and travel cost associated with the diagnosis and maintenance.

Figure 28:
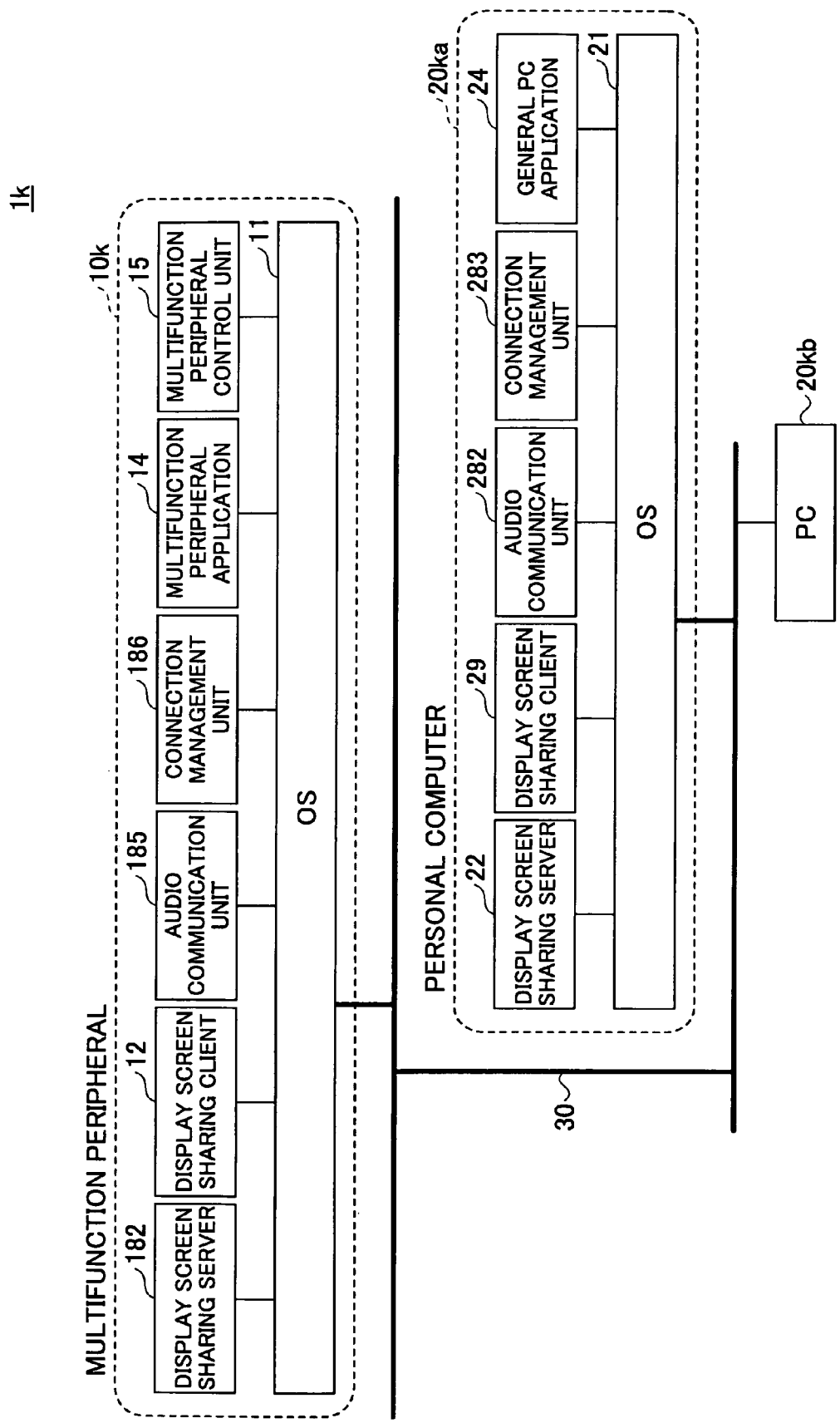
FIG. 28 is a drawing showing an example of the configuration of an information processing system according to a fourteenth embodiment.

In the following, a fourteenth embodiment will be described. FIG. 28 is a drawing showing an example of the configuration of an information processing system according to the fourteenth embodiment. In FIG. 28, the same elements as those of FIG. 27 or FIG. 25 are referred to by the same numerals, and a description thereof will be omitted.

In an information processing system 1*k* shown in FIG. 28, a multifunction peripheral 10*k* and a personal computer 20*ka* each have both a display screen sharing server and a display screen sharing client installed therein. In the multifunction peripheral 10*k*, the display screen sharing server 182 and the display screen sharing client 12 are provided. In the personal computer 20*ka*, the display screen sharing server 22 and the display screen sharing client 29 are provided. In this manner, both of the apparatuses are capable of sharing a display screen of the other.

Further, the multifunction peripheral 10*k* and the personal computer 20*ka* have an audio communication unit 185 and an audio communication unit 282 implemented therein, respectively. The audio communication unit 185 and the audio communication unit 282 are voice call software that provides voice call function based on TCP/IP. It should be noted that each of the multifunction peripheral 10*k* and the personal computer 20*ka* is provided with an audio input device (not shown).

Further, the multifunction peripheral 10*k* and the personal computer 20*ka* has a connection management unit 186 and a connection management unit 283 implemented therein, respectively. The connection management unit 186 and the connection management unit 283 provide the function to control display screen sharing and audio communication.

The network 30 of the information processing system 1*k* is also connected to a personal computer 20*kb* having substantially the same functions as the personal computer 20*ka*. The personal computer 20*ka* and the personal computer 20*kb* together constitute a support center for the multifunction peripheral 10*k*.

Moreover, the display screen sharing servers provided in the multifunction peripheral 10*k*, the personal computer 20*ka*, and the personal computer 20*kb* can share a connection session with a plurality of display screen sharing clients. The voice call functions provided in the multifunction peripheral 10*k*, the personal computer 20*ka*, and the personal computer 20*kb* can support a voice call between three or more parties.

The connection management units 186 and 283, the display screen sharing clients 12 and 29, the display screen sharing servers 182 and 22, and the audio communication units 185 and 282 are configured to control communication by use of a technology such as NAT (Network Address Translation) or NAPT (Network Address Port Translation) so as to conduct communication within and with outside the LAN. Alternately, IPv6 is used to conduct communication by directly specifying an IP address by use of a global address.

Figure 29:
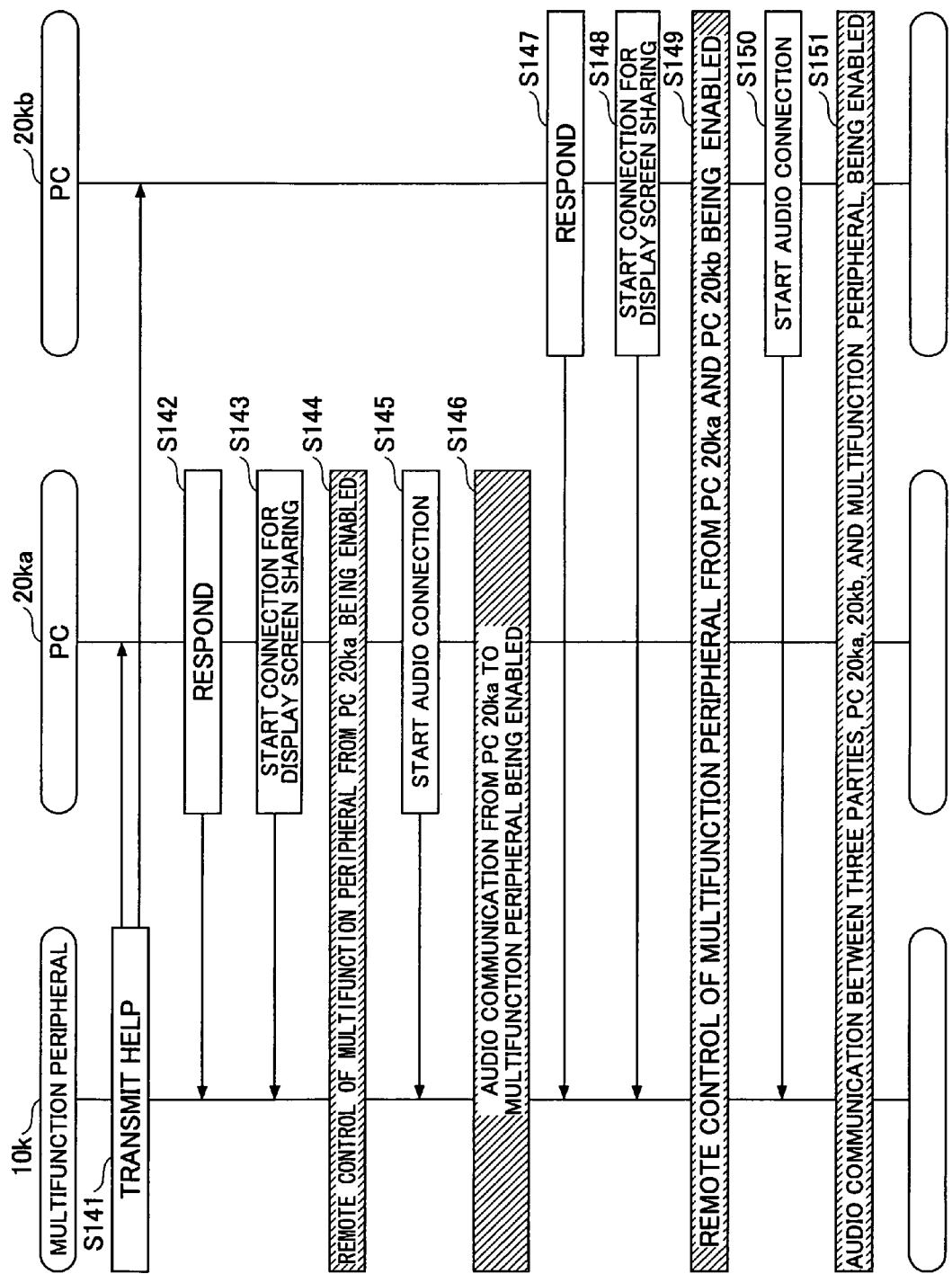
FIG. 29 is a drawing showing a first operating procedure of the information processing system according to the fourteenth embodiment.

FIG. 29 is a drawing showing a first operating procedure of the information processing system according to the fourteenth embodiment.

The user of the multifunction peripheral 10*k* instructs to call the support center via the operation panel 111 in order to make an inquiry to the support center. In response, the connection management unit 186 transmits a help message to the support center (S141). The address to which the help message is directed may be registered in advance in the multifunction peripheral 10*k*, or may be entered by the user at the time of calling the support center. The help message may be transmitted to only one of the personal computer 20*ka* and the personal computer 20*kb*, or may be transmitted to both of them.

The personal computer 20*ka*, which has received the help message as the support center, responds to this help message (S142). In response, the operation panel 111 of the multifunction peripheral 10*k* displays a message indicative of the receipt of the response from the support center. The connection management unit 283 of the personal computer 20*ka* controls the display screen sharing client 29 to start a connection for display screen sharing with the multifunction peripheral 10*k* (S143) Upon the completion of the sharing of a display screen, the remote controlling of the multifunction peripheral 10*k* from the personal computer 20*ka* becomes possible (S144).

Following this, the connection management unit 283 of the personal computer 20*ka* controls the connection of the audio communication unit 282 to establish an audio communication connection with the multifunction peripheral 10*k* (S145). With this provision, the display screen of the operation panel 111 of the multifunction peripheral 10*k* is shared at the personal computer 20*k*, and a voice call can be conducted with the multifunction peripheral 10*k* while remotely operating the multifunction peripheral 10*k*.

If the help message is also transmitted to the personal computer 20*kb*, the personal computer 20*kb* may respond to the help message with some delay while the multifunction peripheral 10*k* is connected with the personal computer 20*ka* (S147). In this case, the connection management unit 283 of the personal computer 20*kb* controls the connections of display screen sharing and audio communication in the same manner as in the case of the personal computer 20*ka* (S148 through S150). As a result, the sharing of the display screen and audio communication between three parties are established between the personal computer 20*ka*, the personal computer 20*kb*, and the multifunction peripheral 10*k*.

Figure 30:
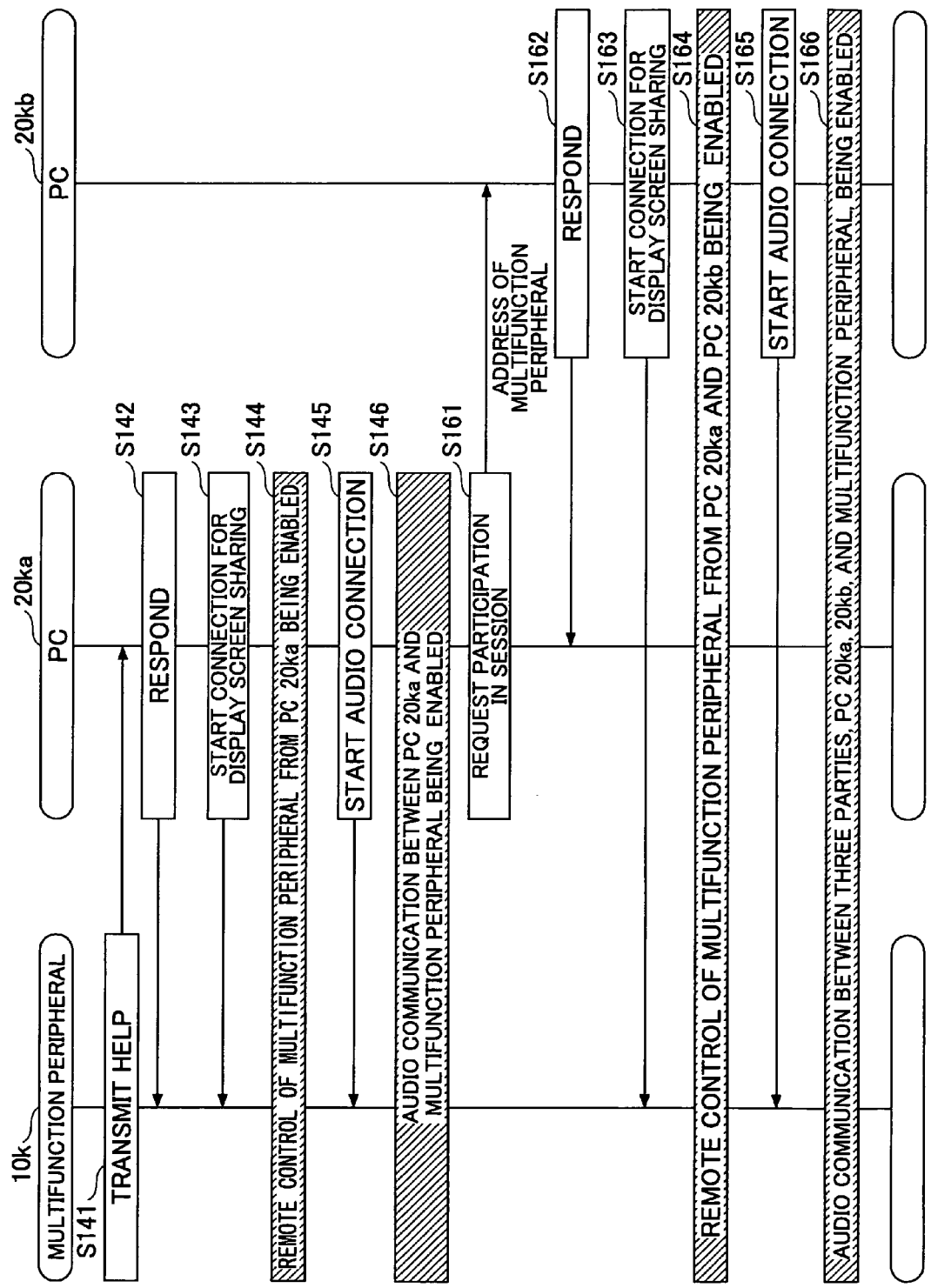
FIG. 30 is a drawing showing a second operating procedure of the information processing system according to the fourteenth embodiment.

In the following, a description will be given of a case in which the personal computer 20*ka* maintaining a connection with the multifunction peripheral 10*k* allows the personal computer 20*kb* having no connection to join the currently ongoing session. FIG. 30 is a drawing showing a second operating procedure of the information processing system according to the fourteenth embodiment. In FIG. 30, the same steps as those of FIG. 29 are referred to by the same numerals, and a description thereof will be omitted as appropriate.

In FIG. 30, the procedure following step S161 differs from that of FIG. 29. After display screen sharing and audio communication become possible between the multifunction peripheral 10*k* and the personal computer 20*ka* having responded to the help message from the multifunction peripheral 10*k* (S146), the user of the personal computer 20*ka* may attempt to include the personal computer 20*kb* to the session in the procedure following step S161. A description of such procedure will be given below. In the contemplated scenario, the user of the personal computer 20*ka* may act as a contact man at the information desk of the support center, and the user of the personal computer 20*kb* may be an engineer.

The user of the personal computer 20*ka* instructs the connection management unit 283 to accept the participation of the personal computer 20*kb* in the current session. In response, the connection management unit 283 transmits a message requesting participation in the current cession (hereinafter referred to as "participation requesting message") to the connection management unit 283 of the personal computer 20*kb* (S161). The participation requesting message includes the information necessary to participate in the cession (hereinafter referred to as "session participation information") such as the IP address of the multifunction peripheral 10*k* currently connected to the personal computer 20*ka*. The connection management unit 283 of the personal computer 20*kb* responds to the connection management unit 283 of the personal computer 20*kb*, and, then, controls the connections of display screen sharing and audio communication based on the session participation information in the same manner as in the personal computer 20*ka* (S163 through S165). As a result, display screen sharing and voice calls between three parties are established between the personal computer 20*ka*, the personal computer 20*kb*, and the multifunction peripheral 10*k*.

It should be noted that the connection management unit 283 of the personal computer 20*ka* may not only manage the IP addresses of other personal computers connectable to the session, but also manage individual staff members of the support center paired with the IP addresses of these staff members. A list of these staff members may be presented to the user of the personal computer 20*ka* to let the user select one or more staff members who are invited to participate in the session. In this case, a request to participate in the session is transmitted to the IP addresses paired with the selected staff members.

A multicast address or broadcast address covering a plurality of staff members (group) may be registered. A request to participate in the session may be transmitted to a plurality of personal computers by use of such broadcast or multicast address, rather than on a staff-member-specific basis. Further, it does not matter which one of the connection of display screen sharing and the connection of audio communication is established first.

As described above, according to the information processing system 1*k* of the fourteenth embodiment, a plurality of personal computers can share the display screen of the multifunction peripheral 10*k*, and another personal computer can be additionally connected halfway through the communication. When the support center receives an inquiry from a customer, and the first person who received the inquiry cannot respond, other staff of the support center or an engineer of a technical division may be asked to participate in the current shared session so as to assist in responding to the customer. With this provision, the support center is able to handle customers smoothly, and the labor cost and travel cost associated with maintenance can be reduced.

Further, since audio communication is enabled between the multifunction peripheral 10*k* and the personal computer 20*k* which are connected to each other through display screen sharing, conversation can be readily conducted by operating the multifunction peripheral 10*k* without dialing the dial buttons after finding the telephone number. Moreover, both hands are free, which is different from when telephone is used. The customer can thus operate the multifunction peripheral 10*k* with ease. Unlike the ordinary telephone link, further, three or more parties can join conversation at the same time. This makes it possible to talk with a plurality of support staff members, thereby providing a more clarified response to the customer.

In the following, a description will be given of a fifteenth embodiment. The system configuration of the fifteenth embodiment is the same as that shown in FIG. 28.

Figure 31:
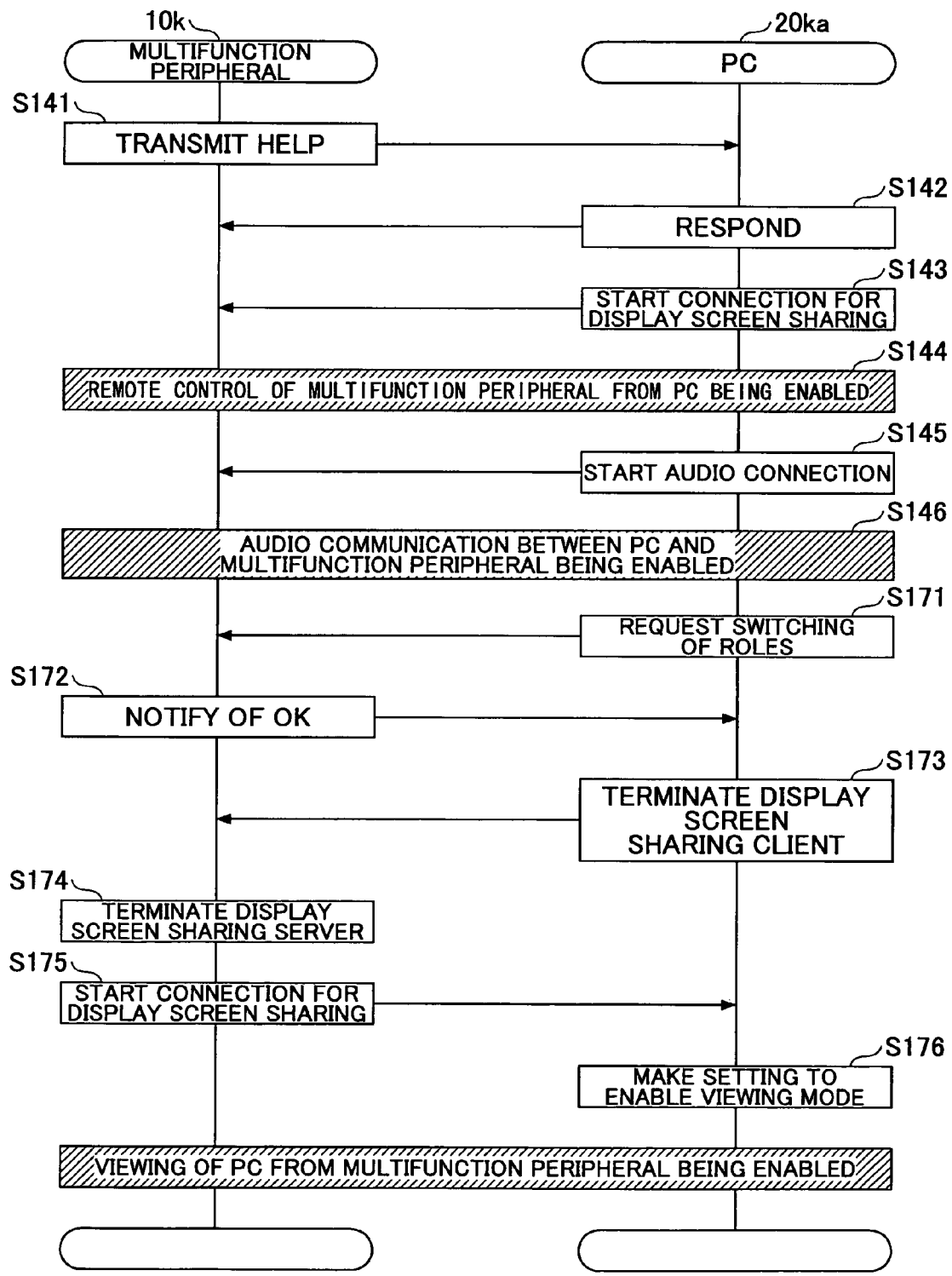
FIG. 31 is a drawing showing an operating procedure of the information processing system according to a fifteenth embodiment.

FIG. 31 is a drawing showing an operating procedure of the information processing system according to the fifteenth embodiment. In FIG. 31, the same steps as those of FIG. 30 are referred to by the same numerals, and a description thereof will be omitted as appropriate. With reference to FIG. 31, a description will be given of an example (switching of roles) in which the display screen of the personal computer 20kb is shared on the operation panel 111 of the multifunction peripheral 10k while the personal computer 20ka is conducting a voice call by remotely operating the multifunction peripheral 10k (S146).

In FIG. 31, the procedure following step S171 differs from that of FIG. 30. The user of the personal computer 20ka instructs the connection management unit 283 to switch roles. In response, the connection management unit 283 transmits a message requesting the switching of roles to the multifunction peripheral 10k (S171). The connection management unit 186 of the multifunction peripheral 10k sends a reply indicative of the acceptance of the switching of roles (S172). In response, the connection management unit 283 disconnects the connection of the display screen sharing client 29 (S173) The connection management unit 186 of the multifunction peripheral 10k detects the disconnection of the display screen sharing server 182 caused by the disconnection of the display screen sharing client 29 (S174). The connection management unit 186 of the multifunction peripheral 10k then controls the communication of the display screen sharing client 12, thereby causing the display screen sharing client 12 to be connected to the display screen sharing server 22 running on the personal computer 20ka (S175).

In this case, the sharing of the display screen of the personal computer 20ka at the multifunction peripheral 10k is permitted in terms of the viewing of the display screen, but the connection management unit 283 of the personal computer 20ka sets the display screen sharing server 22 to the mode (viewing mode) that permits only the viewing of the display screen but prohibits the remote control thereof. Namely, settings are made to the display screen sharing server 22 such that the display screen sharing server 22 does not attend to the mouse and key events transmitted from the display screen sharing client 12. Thereafter, roles may be further switched such that the multifunction peripheral 10k is remotely controlled from the personal computer 20ka. In such a case, connection control is performed similarly to the manner as described above.

Even when two or more personal computers are connected to the multifunction peripheral 10k, communication control may be performed similarly to the manner as described above. In such a case, the control of connection destinations and the control to decide whether or not to set the viewing mode are performed between the connection management units of the personal computers and the multifunction peripheral 10k.

As described above, according to the information processing system 1k of the fifteenth embodiment, the desktop display screen of the personal computer 20ka illustrating proper measures can be displayed on the operation panel 111 of the multifunction peripheral 10k when the personal computer 20ka of the support center was remotely controlling the multifunction peripheral 10k. This provides for flexible responses to be made to the customer. Further, the labor cost and travel cost associated with maintenance can be reduced.

Figure 32:
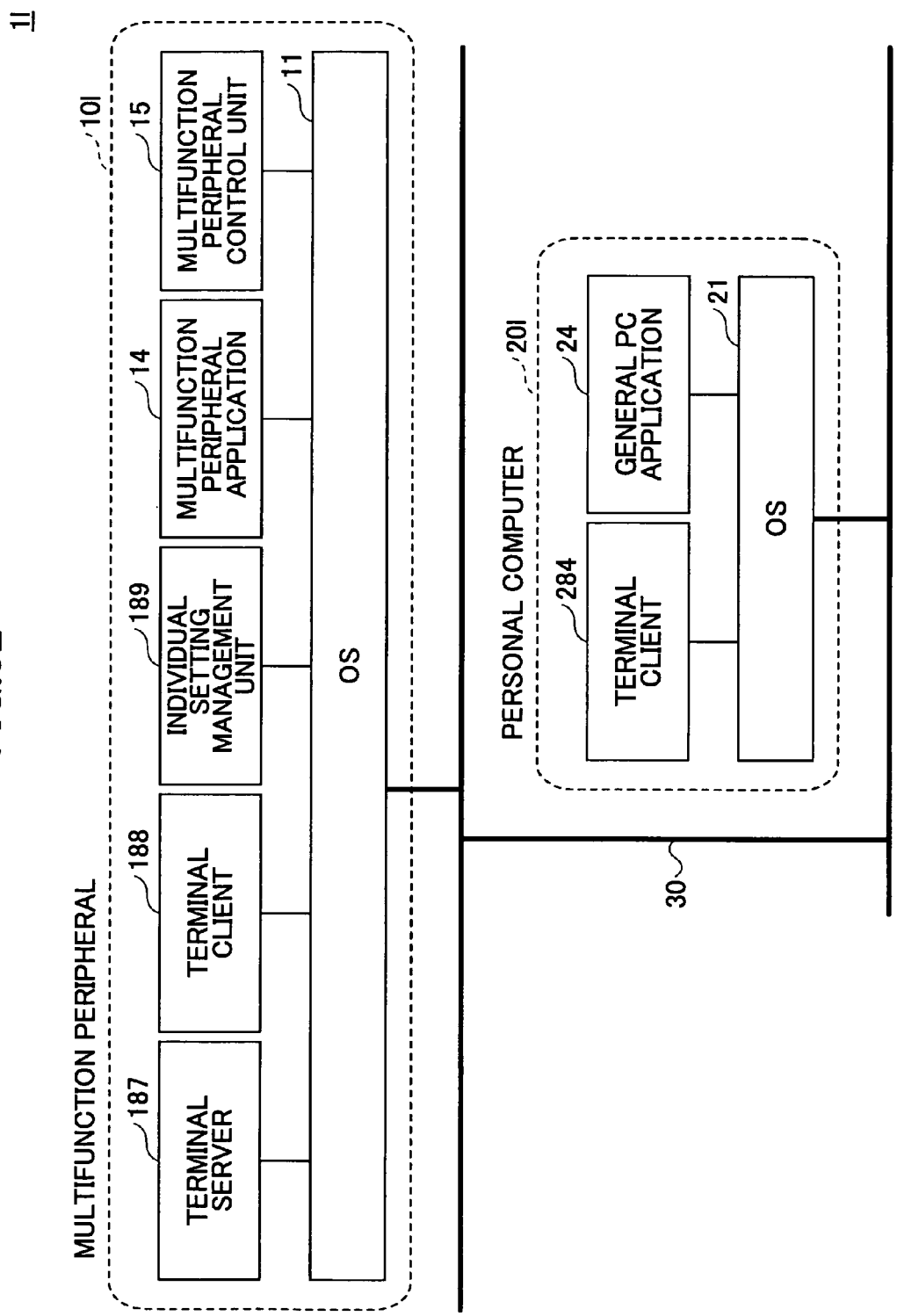
FIG. 32 is a drawing showing an example of the configuration of an information processing system according to a sixteenth embodiment.

In the following, a sixteenth embodiment will be described. FIG. 32 is a drawing showing an example of the configuration of an information processing system according to the sixteenth embodiment. In FIG. 32, the same elements as those of FIG. 2 are referred to by the same numerals, and a description thereof will be omitted.

In an information processing system 11 shown in FIG. 32, a multifunction peripheral 101 has a terminal server 187, a terminal client 188, and an individual setting management unit 189 implemented therein.

The terminal server 187 is software that provides a user-specific GUI environment (desktop environment) to a plurality of users. Microsoft Windows Terminal Server or Citrix MetaFrameXP may be used, for example.

The individual setting management unit 189 serves to manage a user-specific GUI environment.

The terminal client 188 is software that implements on the operation panel 111 the user-specific GUI environment provided by the terminal server 187.

With this provision, the user can display and operate his/her own desktop display screen on the operation panel 111 by activating the terminal client 188 of the multifunction peripheral 101. When a user A inserts his/her IC card into the multifunction peripheral 101, for example, the terminal client 188 is activated to perform a logon process for using the user A's desktop display screen.

For the user A, an initial display screen may be set such that a copying display screen is displayed that specifies the choice of color copy, the use of A4 sheets, duplex printing, combined printing to print two pages on one sheet, and the order of arrangements being from the left to the right, and such that a scanner application is activated that is configured to store the scanned TIFF file in the shared folder of the user A's personal computer 201. In this case, such an initial display screen is displayed on the desktop display screen. In this manner, the user can customize the operation display screen presented on the operation panel 111 according to his/her preferences.

The personal computer 201 has a terminal client 284 implemented therein, which has substantially the same functions as the terminal client 188. With this provision, the user can access his/her desktop display screen managed by the multifunction peripheral 101 by use of the terminal client 284 of the personal computer 201. Namely, the user can make settings to the desktop display screen for the multifunction peripheral 101 from the personal computer 201 at his/her desk.

In this manner, the information processing system 11 can display the same user-specific display screen at the multifunction peripheral 101 and at the personal computer 201. When the terminal client 188 is activated from the operation panel 111 of the multifunction peripheral 101, copy and scan functions may be freely used. When the terminal client 284 is activated to operate at the personal computer 201, however, some restrictions need to be put in place. Accordingly, an operation procedure as follows may be used to perform control.

Figure 33:
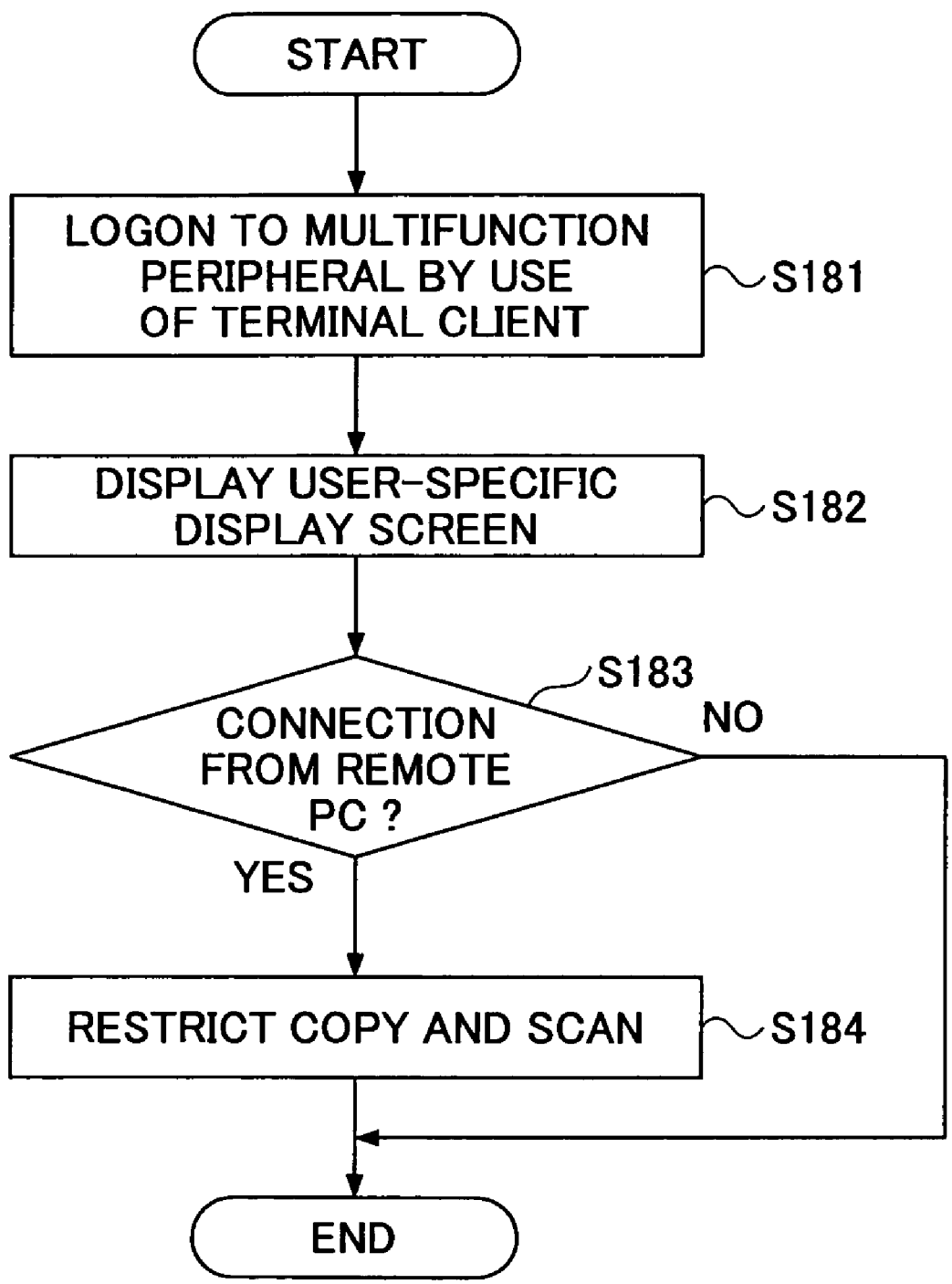
FIG. 33 is a flowchart showing a first operating procedure of the information processing system of the sixteenth embodiment.

FIG. 33 is a flowchart showing a first operating procedure of the information processing system of the sixteenth embodiment.

The user logs on by use of the terminal client 188 of the multifunction peripheral 101 or the terminal client 284 of the personal computer 201 (S181). In response, a user-specific desktop display screen is displayed on the operation panel 111 of the multifunction peripheral 101 or on the display device 206 of the personal computer 201 (S182).

The terminal server 187 checks whether the operation is remote control from the personal computer 201 (S183). If it is ascertained that the operation is remote control (YES at S183), the terminal server 187 only permits operations to make settings on the desktop display screen, and prohibits the use of the copy and scan functions and the like (S184). If it is ascertained that the operation is performed at the operation panel 111 of the multifunction peripheral 101 (NO at S183), the terminal server 187 permits the copy and scan functions and the like on top of the other operations.

With this provision, it is possible to prevent copying and/or scanning operations unexpected to the user working at the multifunction peripheral 101 from being activated by another user working at the personal computer 201.

Figure 34:
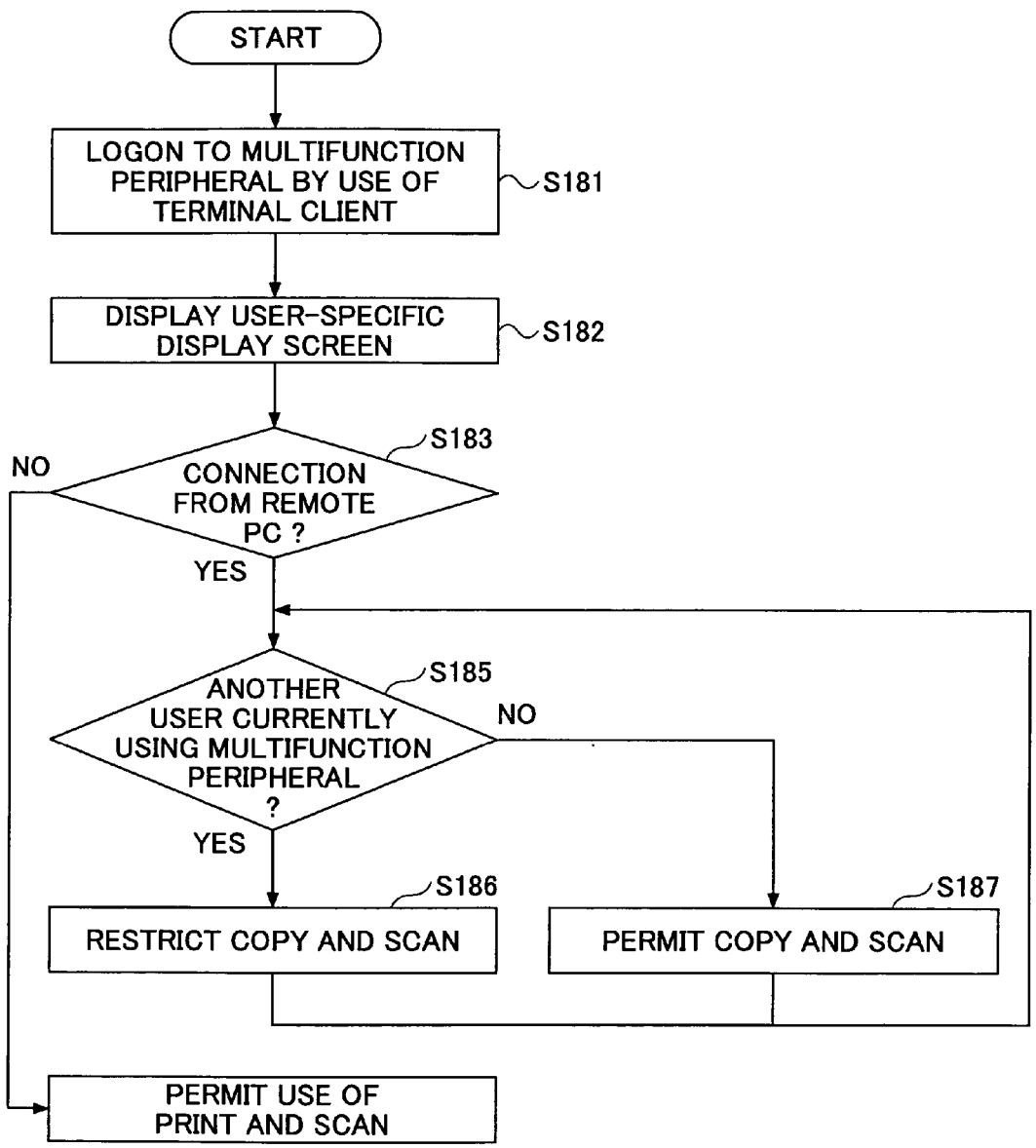
FIG. 34 is a flowchart showing a second operating procedure of the information processing system of the sixteenth embodiment.

FIG. 34 is a flowchart showing a second operating procedure of the information processing system of the sixteenth embodiment. In FIG. 34, the same steps as those of FIG. 33 are referred to by the same numerals, and a description thereof will be omitted.

In FIG. 34, the procedure following step S185 differs from that of FIG. 33. If the operation is remote control from the personal computer 201 (YES at S183), a check is made at step S185. If there is no user using the terminal client 188 at the operation panel 111 of the multifunction peripheral 101 (NO at S185), the use of the copy and scan functions is permitted (S187). Otherwise (YES at S185), the use of the copy and scan functions is prevented (restricted) (S186).

Provision may be made such that a user having a special administrator privilege can use the copy and scan functions exclusively without any restriction even when having logged on from the personal computer 201.

On the operation panel 111 of the multifunction peripheral 101, a desktop display screen for a guest account may be presented as a default. It may be preferable to display a user-specific desktop display screen as such need arises.

Further, a support system may be provided such that the remote maintenance of the multifunction peripheral 101 can be performed by use of a terminal service.

Moreover, a terminal server may be implemented on the personal computer 201. A logon process may be performed by activating the terminal client 188 of the multifunction peripheral 101 so as to call up the user-specific desktop display screen of the personal computer 201 on the operation panel 111.

The terminal server does not have to be Windows Terminal Server. Alternately, the X-Window system used in UNIX or Linux may be employed.

As described above, according to the information processing system 11 of the sixteenth embodiment, the multifunction peripheral 101 can provide a user-specific desktop display screen in much the same manner as terminal servers widely used today provide user-specific desktop environments. Accordingly, the user can operate the multifunction peripheral 101 with ease by use of the environment for which his/her specific settings are made.

Moreover, remote logon to the multifunction peripheral 101 can be performed from the personal computer 201 so as to display the desktop display screen of the multifunction peripheral 101 on the display device 206 of the personal computer 201. With this provision, the user can operate the multifunction peripheral 101 by use of the same operation environment that is used when working at the multifunction peripheral 101, without the need to go all the way to the site where the multifunction peripheral 101 is situated. Further, even when another user is working at the multifunction peripheral 101, user-specific settings can be modified from the personal computer 201. When the user uses the multifunction peripheral 101, the user can perform a program only with the terminal client privilege as a general rule. This can prevent the settings relating to the entire system from being modified without permission.

Further, when the multifunction peripheral 101 is operated through remote control, the use of the copy and scan functions is restricted. Even when a remote logon user issues a scan start instruction or copy start instruction, a user working at the multifunction peripheral 101 will not be disturbed when doing his/her work.

It should be noted that a plurality of operating systems, rather than a Windows OS alone, may be operating at the multifunction peripheral in any one of the first through sixteenth embodiments. The copy, scan, printer, and FAX functions of the multifunction peripheral may be controlled by programs operating on the operating system unique to the multifunction peripheral, and the applications relating to user interface and displaying on the operation panel 111 may be made to operate on the Windows OS. In such a case, provision may be made such that the applications running on the Windows OS and the control programs running on the OS unique to the multifunction peripheral may communicate with each other, thereby controlling the multifunction peripheral from the Windows OS.

It should be noted that the operating system that runs on the multifunction peripheral to provide user interface does not have to be the Windows OS.

Further, the first through sixteenth embodiments described above are not exclusive with each other, and are not alternative to each other. These embodiments may thus be combined according to need, thereby providing an information processing system that is highly convenient.

In these embodiments, a description has been given of an example in which a multifunction peripheral is used. The device of the present invention is not necessarily a combined machine having multiple functions, and may be a network device that has a printer function alone, a scanner function alone, a FAX function alone, or a copy function alone, with the panel to display a GUI.

By the same token, an apparatus connected to the multifunction peripheral through a network is not necessarily a personal computer, and may be an apparatus having a panel to display a GUI such as a PDA (Personal Digital (Data) Assistants) or a mobile phone. Multifunction peripherals may be connected together, thereby achieving the sharing of a display screen between the multifunction peripherals.

Further, the present invention is not limited to these embodiments, but various variations and modifications may be made without departing from the scope of the present invention.

The present application is based on Japanese priority application No. 2005-051671 filed on Feb. 25, 2005, with the Japanese Patent Office, the entire contents of which are hereby incorporated by reference.

What is claimed is:

1. An information processing system, comprising:
an image forming device having a printing unit; and
an information processing apparatus connected to the image forming device via a network,
wherein said image forming device includes
a supplying unit configured to supply, to the information processing apparatus in response to a request from the information processing apparatus, an installer for a printer driver that is necessary for using the printing unit, and
a display screen sharing client unit including
a screen-data receiving unit configured to receive data of a display screen displayed at the information processing apparatus,
a screen-data displaying unit configured to display, on a display unit of said image forming device based on the data of the display screen, the display screen that is displayed at the information processing apparatus,
an operation event acquiring unit configured to detect an operation event that is input into the display screen displayed at the image forming device, and a display screen sharing client unit configured to transmit the operation event to the information processing apparatus, and wherein said information processing apparatus includes:

a display screen sharing server unit configured to supply the data of the display screen displayed at the information processing apparatus, to the image forming device;

an operation event receiving unit configured to receive the operation event transmitted from the image forming device; and a print setting unit configured to send a request for the installer of the printing unit to the image forming device in response to the operation event received by the operation event receiving unit, to activate the installer provided by the image forming device to install a printer device, for a print job to the printing unit, in the information processing apparatus, and to automatically make a setting necessary to cause the printing unit to print document data stored in the information processing apparatus.

2. The information processing system as claimed in claim 1, wherein the printing unit usage information includes a program written as a predetermined script, and wherein the print setting unit is configured to spontaneously make a setting necessary to cause said image forming device to print document data stored in the information processing apparatus by performing the predetermined script.

3. The information processing system as claimed in claim 1, wherein the printing unit usage information includes an installer to install the printer driver corresponding to the printing unit, and wherein the print setting unit is configured to install the printer driver in the information processing apparatus by executing the installer.

4. The information processing system as claimed in claim 1, further including, in the image forming device, a print service unit configured to receive the document data to be printed and print setting information regarding the document data, and to cause the printing unit to print the received document data, wherein said print setting unit is configured to cause a print setting display screen to be displayed to cause the document data and the print setting information to be specified, and to transmit the document data and the print setting information specified on the print setting display screen to the print service unit.

5. The information processing system as claimed in claim 1, wherein the information processing apparatus includes a conversion unit configured to convert the document data into data having a universal data format that is printable by the printing unit, and to request a printout destination to print the data having the universal data format, and wherein said print setting unit is configured to make a setting to the conversion unit such as to specify said image forming device as the printout destination.

6. The information processing system as claimed in claim 1, wherein said image forming device further includes:

a scanner unit; and a scan control unit configured to cause the scanner unit to perform a scan in response to instruction from the information processing apparatus and to transmit scanned information to the information processing apparatus, and wherein said information processing apparatus includes:

a scanner setting unit configured to acquire scanner usage information necessary to use the scanner unit in response to instruction from said image forming device and to spontaneously make a setting in response to the scanner usage information such as to make the scanner unit controllable from the information processing apparatus; and a scanner control unit configured to cause a scanner setting display screen to be displayed to prompt a scan instruction to be entered with respect to the scanner unit controllable from the information processing apparatus, and configured to cause the scanner unit to perform a scan in response to information entered through the scanner setting display screen.

7. The information processing system as claimed in claim 1, wherein said image forming device further includes:

a scanner unit;

a scan control unit configured to cause the scanner unit to perform a scan in response to instruction from an input unit provided in said image forming device; and a scan information transmitting unit configured to transmit image information scanned by said scanner unit to the information processing apparatus, and wherein said information processing apparatus further includes an image information storage unit configured to receive the image information transmitted from said image forming device and to store the received image information in a predetermined memory area.

8. The image forming device of the information processing system as claimed in claim 1.

9. The information processing apparatus of the information processing system as claimed in claim 1.

10. The information processing system as claimed in claim 1, wherein the information processing apparatus sends a print request to the image forming device in response to instruction entered by the user at the image forming device using the display screen of the information processing apparatus, on the image forming device, so that the printing unit of the image forming device prints a document stored in the information processing apparatus in response to the print request.

11. The information processing system as claimed in claim 1, wherein the display screen of the information processing apparatus is displayed on a display device of the information processing apparatus.

12. The information processing system as claimed in claim 1, wherein the display screen of the information processing apparatus displayed on the display unit of said image forming device allows the user at the image forming device to enter the instruction to cause the information processing apparatus to (i) acquire the printing unit usage information and (ii) send to the image forming device a print request requesting that the printing unit of the image forming device print a document stored in the information processing apparatus.

13. The information processing system as claimed in claim 1, wherein the information processing apparatus sets a printer port to a network address of the printing device, in response to the printing unit usage information.

14. The information processing system as claimed in claim 1, wherein the printing unit usage information includes an installer for installing the printer driver necessary for printing to the printing unit.

15. The information processing system as claimed in claim 1, wherein the setting to share the printing unit includes selecting the printer driver of the printing unit already installed on the information processing apparatus, as a shared printer.

16. The information processing system as claimed in claim 1, wherein the print setting unit automatically sets the printing unit as the default printer when making the setting to share the printing unit.

17. An information processing method for an information processing system which includes an image forming device having a printing unit and an information processing apparatus connected to the image forming device via a network, said method comprising:
- a display screen sharing step of making said image forming device and said information processing apparatus share a display screen, including
  - receiving, by the image forming device, data of a display screen displayed at the information processing apparatus,
  - displaying, on a display unit of said image forming device having the printing unit, based on the data of the display screen displayed at the information processing apparatus, the display screen that is displayed at the information processing apparatus,
  - detecting an operation event that is input into the display screen displayed at the image forming device, and
  - transmitting the operation event from the image forming device to the information processing apparatus; and
- a print setting step of causing the information processing apparatus to make a setting to share the printing unit via the network, including
  - receiving, by the image forming device from the information processing apparatus, a request for an installer for a printer driver that is necessary for using the printing unit, in response to the operation event transmitted from the image forming device to the information processing apparatus,
  - supplying, from the image forming device to the information processing apparatus in response to the request from the information processing apparatus, the installer for the printer driver that is necessary for using the printing unit, and
  - causing the installer provided by the image forming device to be activated to install a printer device, for a print job to the printing unit, in the information processing apparatus, and to automatically make a setting necessary to cause the printing unit to print document data stored in the information processing apparatus.

18. The information processing method as claimed in claim 17, wherein the printing unit usage information includes a program written as a predetermined script, and wherein the print setting step makes a setting to cause said image forming device to print document data stored in the information processing apparatus by performing the predetermined script.

19. The information processing method as claimed in claim 17, wherein the printing unit usage information includes an installer to install the printer driver corresponding to the printing unit, and wherein the print setting step installs the printer driver in the information processing apparatus by executing the installer.

20. The information processing method as claimed in claim 17, wherein the information processing system further includes, in the image forming device, a print service unit configured to receive the document data to be printed and print setting information regarding the document data, and to cause the printing unit to print the received document data, wherein said print setting step causes a print setting display screen to be displayed to cause the document data and the print setting information to be specified, and to transmit the document data and the print setting information specified on the print setting display screen to the print service unit.

21. The information processing method as claimed in claim 17, wherein the information processing apparatus includes a conversion unit configured to convert the document data into data having a universal data format that is printable by the printing unit, and to request a printout destination to print the data having the universal data format, and wherein said print setting step makes a setting to the conversion unit such as to specify the image forming device as the printout destination.

22. The information processing method as claimed in claim 17, wherein said image forming device further includes a scanner unit, said method further comprising:
- a scanner setting step of causing the information processing apparatus to acquire scanner usage information necessary to use the scanner unit in response to instruction from said image forming device, and to make a setting in response to the scanner usage information such as to make the scanner unit controllable from the information processing apparatus;
- a scan request step of causing the information processing apparatus to cause a scanner setting display screen to be displayed to prompt a scan instruction to be entered with respect to the scanner unit controllable from the information processing apparatus, and to transmit a scan instruction to the image forming device in response to information entered through the scanner setting display screen; and
- a scan performing step of causing the scanner unit to perform a scan in response to the scan instruction from the information processing apparatus to transmit scanned information to the information processing apparatus.

23. The information processing method as claimed in claim 17, wherein said image forming device further includes a scanner unit, said method further comprising:
- a scan performing step of causing the scanner unit to perform a scan in response to instruction from an input unit provided in said image forming device;
- a scan information transmitting step of causing the image forming device to transmit image information scanned by said scanner unit to the information processing apparatus; and
- an image information storage step of causing the information processing apparatus to receive the image information transmitted from said image forming device to store the received image information in a predetermined memory area.

24. The information processing method as claimed in claim 17, further comprising:
- sending a print request from the information processing apparatus to the image forming device in response to instruction entered by the user at the image forming device using the display screen of the information processing apparatus, on the image forming device, to cause the printing unit of the image forming device to print a document stored in the information processing apparatus in response to the print request.

25. A non-transitory computer-readable medium embodying a program of instructions executable by a computer, which is connected via a network to an image forming device having a printing unit, and has a display screen thereof displayed on a display unit of said image forming device through display screen sharing, to cause the computer to perform:
- a display screen sharing step of making said image forming device and said computer share a display screen, including
  - supplying, from the computer to the image forming device, data of a display screen displayed at the computer,
  - causing to be displayed, on the display unit of said image forming device having the printing unit, based on the data of the display screen displayed at the computer, the display screen that is displayed at the computer, receiving from the image forming device an operation event that is input into the display screen displayed at the image forming device; and a print setting step of making a setting to share the printing unit via the network, including sending, to the image forming device, a request for an installer for a printer driver that is necessary for using the printing unit, in response to the operation event received from the image forming device, activating the installer provided by the image forming device to install a printer device, for a print job to the printing unit, in the computer, and automatically making a setting necessary to cause the printing unit to print document data stored in the computer.

26. The computer-readable medium as claimed in claim 25, wherein the printing unit usage information includes a program written as a predetermined script, and wherein the print setting step makes a setting necessary to cause said image forming device to print the document data stored in the computer by performing the predetermined script.

27. The computer-readable medium as claimed in claim 25, wherein the printing unit usage information includes an installer to install the printer driver corresponding to the printing unit, and wherein the print setting step installs the printer driver in the computer by executing the installer.

28. The computer-readable medium as claimed in claim 25, wherein said print setting step causes a print setting display screen to be displayed to prompt document data and print setting information to be specified, and to transmit the document data and the print setting information specified on the print setting display screen to a predetermined device.

29. The computer-readable medium as claimed in claim 25, wherein said image forming device further includes a scanner unit, said program further causing the computer to perform:

a scanner setting step of acquiring scanner usage information necessary to use the scanner unit in response to instruction from said image forming device, and making a setting in response to the scanner usage information such as to make the scanner unit controllable from the computer; and a scan request step of causing a scanner setting display screen to be displayed to prompt a scan instruction to be entered with respect to the scanner unit controllable from the computer, and transmitting a scan instruction to the image forming device in response to information entered through the scanner setting display screen.

30. The computer-readable medium of claim 25, wherein the program of instructions executable by the computer, causes the computer to send a print request from the computer to the image forming device in response to instruction entered by the user at the image forming device using the display screen of the information processing apparatus, on the image forming device, to cause the printing unit of the image forming device to print a document stored in the computer in response to the print request.

* * * * *